United States Patent [19]

Funyu et al.

[11] Patent Number: 4,590,658
[45] Date of Patent: May 27, 1986

[54] TUBE WALL THICKNESS MEASUREMENT

[75] Inventors: Yutaka Funyu; Tadashi Okumura, both of Handa; Asao Monno; Masami Shimizu, both of Hino, all of Japan

[73] Assignee: Fuji Electric Company, Ltd., Japan

[21] Appl. No.: 520,153

[22] Filed: Aug. 4, 1983

Related U.S. Application Data

[62] Division of Ser. No. 274,531, Jun. 17, 1981.

[30] Foreign Application Priority Data

| Jun. 19, 1980 | [JP] | Japan | 55-82162 |
| Jun. 19, 1980 | [JP] | Japan | 55-82163 |
| Jun. 25, 1980 | [JP] | Japan | 55-85213 |
| Jun. 27, 1980 | [JP] | Japan | 55-86654 |
| Sep. 26, 1980 | [JP] | Japan | 55-132986 |

[51] Int. Cl.$^4$ .............................. B23Q 3/00
[52] U.S. Cl. ...................... 29/464; 29/467; 378/147; 33/181 R
[58] Field of Search ............... 29/467, 468, 465, 466; 33/181 R, 168 R, 168 B; 378/147, 150, 146, 59, 205

[56] References Cited

U.S. PATENT DOCUMENTS

| 2,642,668 | 6/1953 | Dorel | 33/168 R |
| 2,748,290 | 5/1956 | Reichertz | 250/360.1 X |
| 3,227,880 | 1/1966 | Widerøe | 378/147 X |
| 3,500,520 | 3/1970 | Oess | 29/468 X |
| 3,795,874 | 3/1974 | Pan et al. | |
| 3,869,615 | 3/1975 | Hoover et al. | 378/147 X |
| 3,873,830 | 3/1975 | Forster | |
| 3,944,830 | 3/1976 | Dissing | |

OTHER PUBLICATIONS

Standard Gauge Company, "Gauges", 4/7/1929, p. 21.

Primary Examiner—Howard N. Goldberg
Assistant Examiner—John T. Burtch
Attorney, Agent, or Firm—Brumbaugh, Graves, Donohue & Raymond

[57] ABSTRACT

A method and apparatus for measuring the thickness of the wall of a tubular object includes a measurement of the intensity of a radiation beam passing through the walls and quantizing the indicated value of radiation detected by a detector with reference to a predetermined period of time. Data is expressed diagrammatically, and inflection points on the graph line indicating when the radiation beam contacts the outer and inner peripheral walls of the tube are determined and processed to thereby determine the wall thickness. There is also disclosed a method for aligning collimator members utilized in the radiation beam scanning equipment.

2 Claims, 48 Drawing Figures

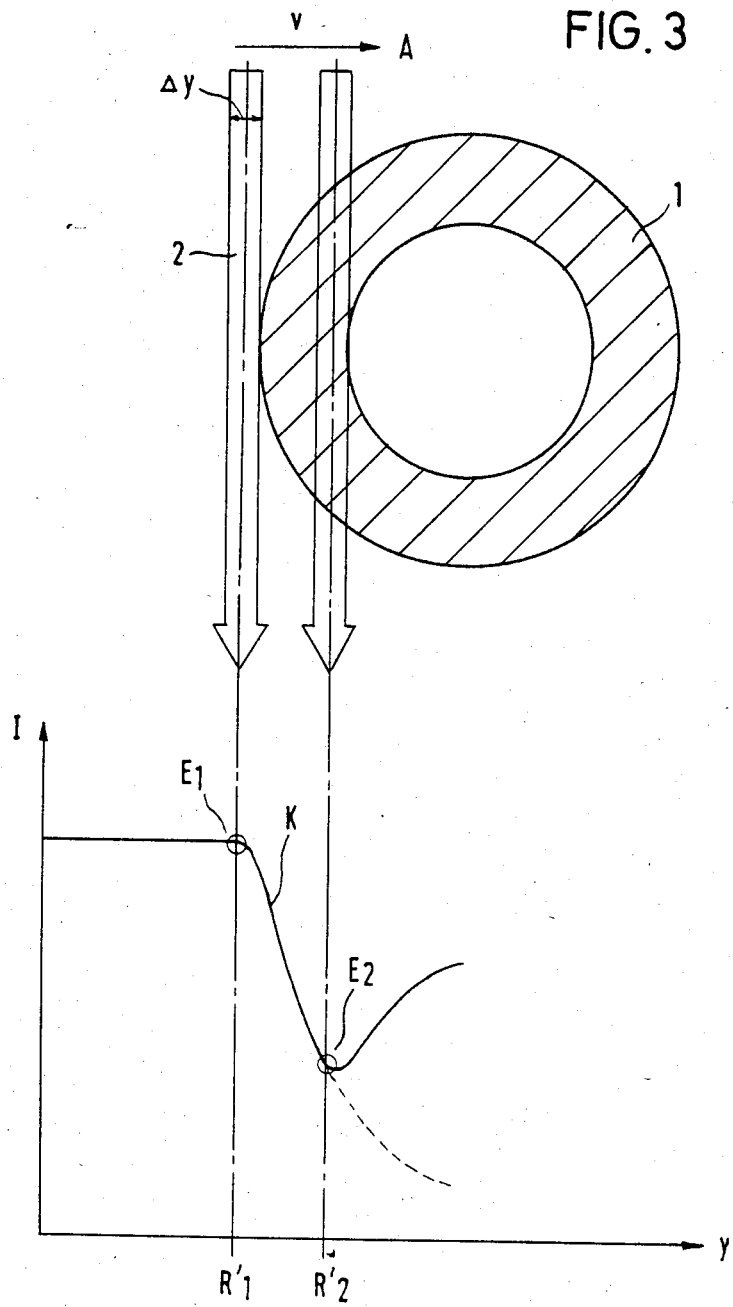

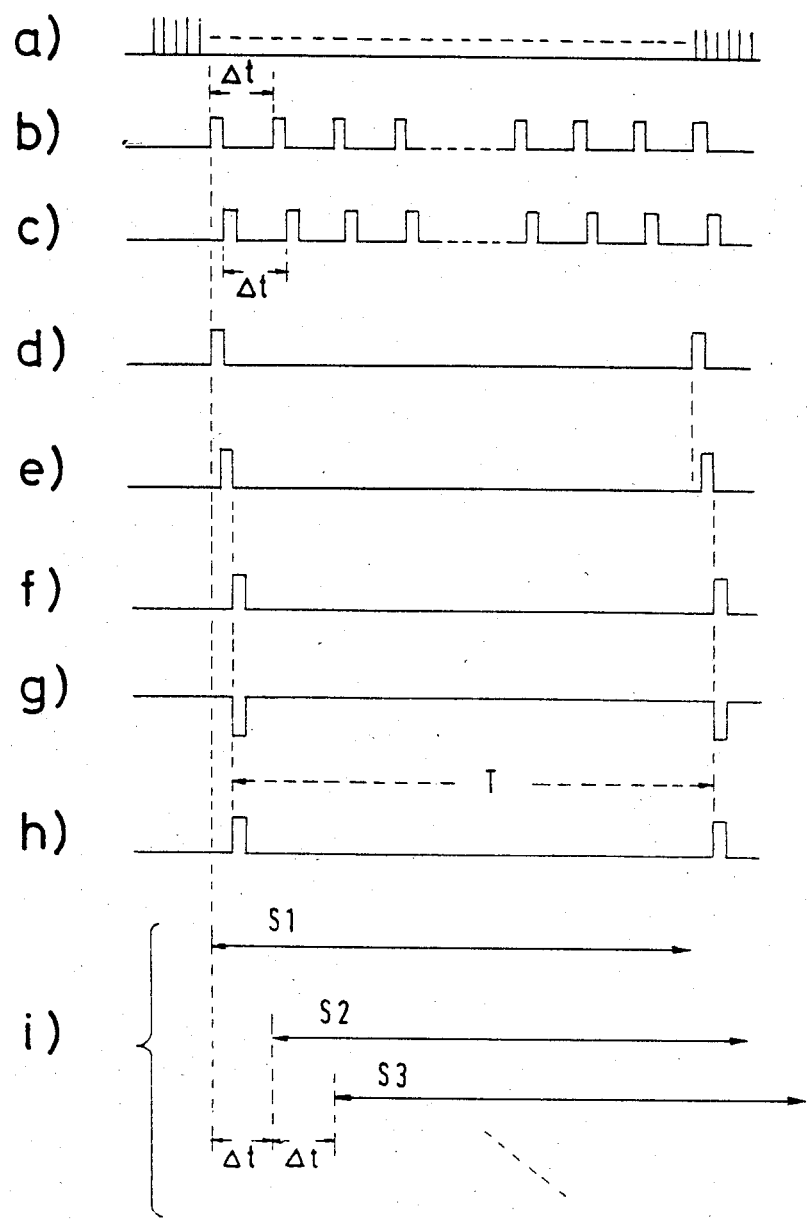

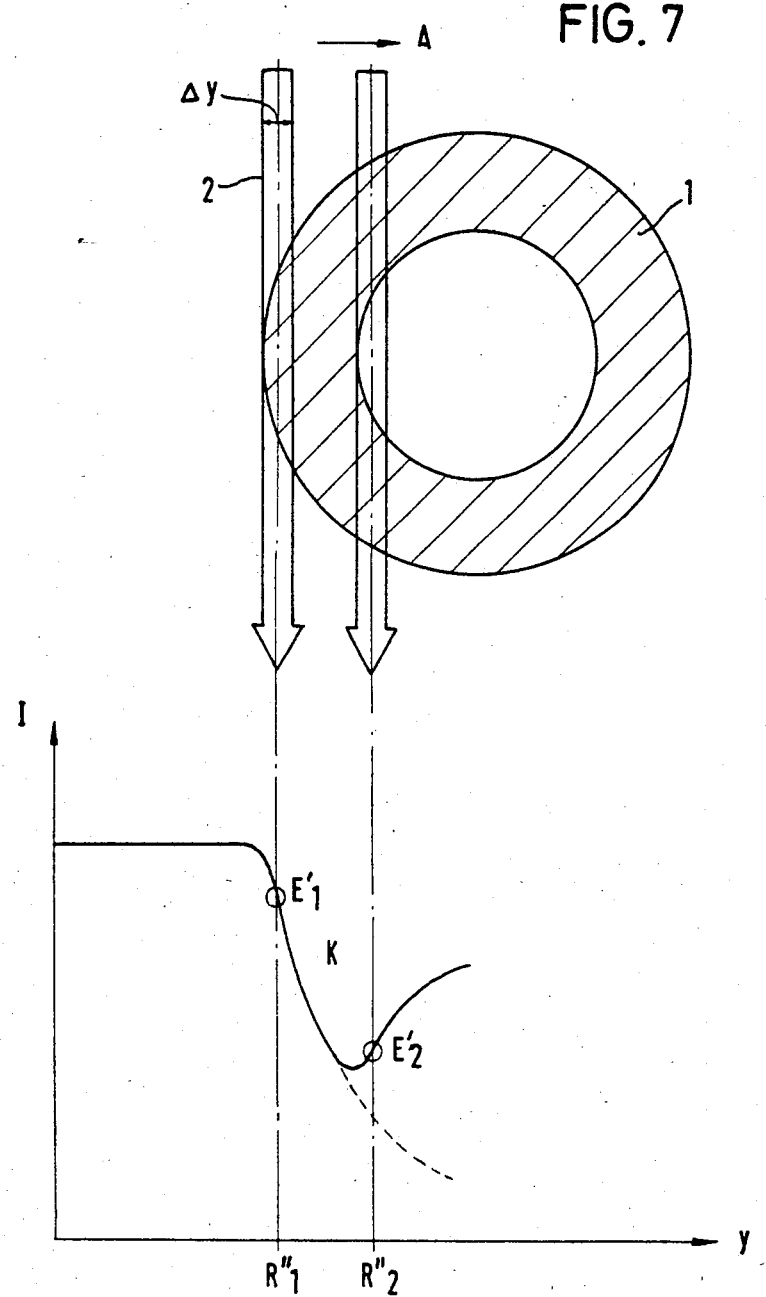

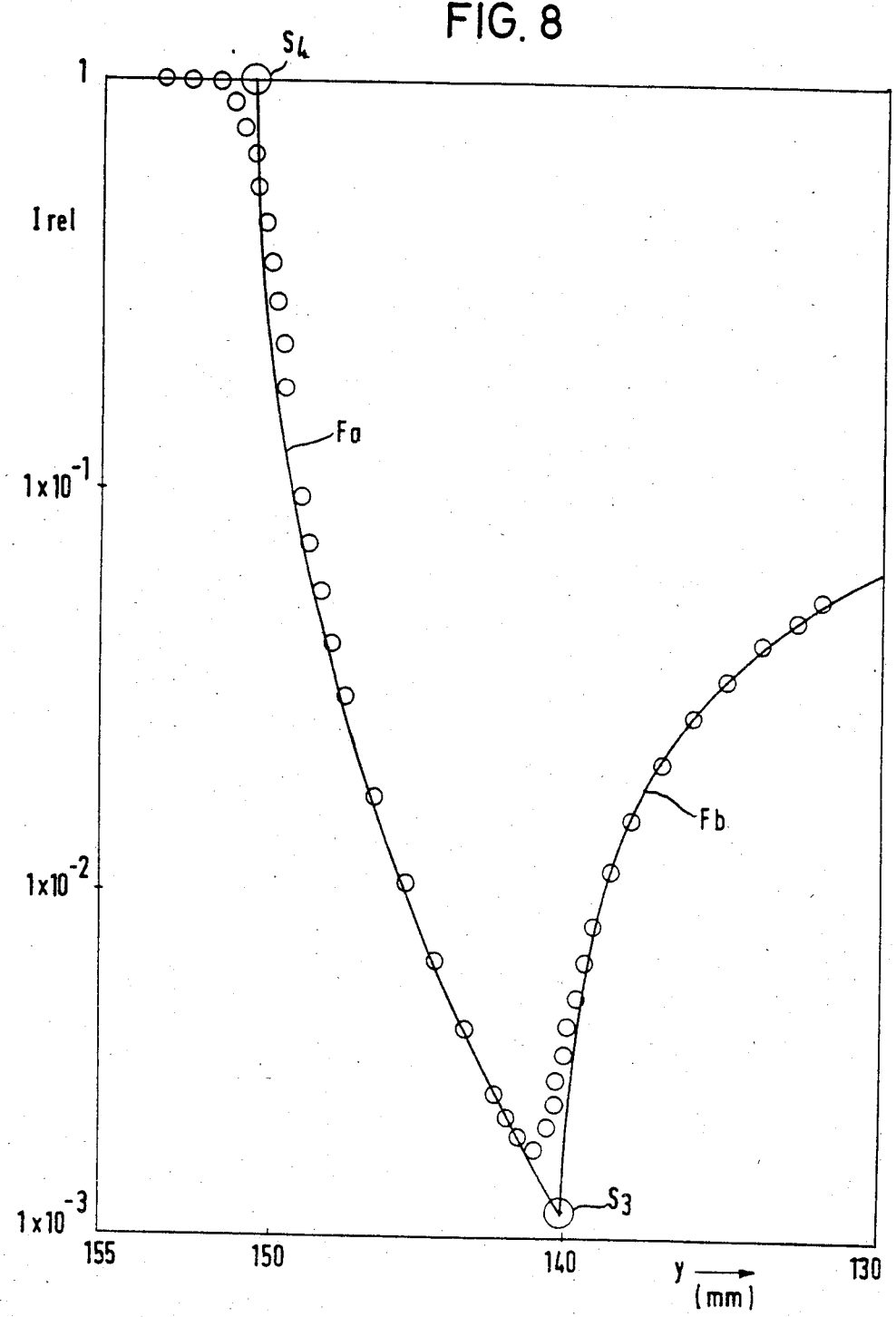

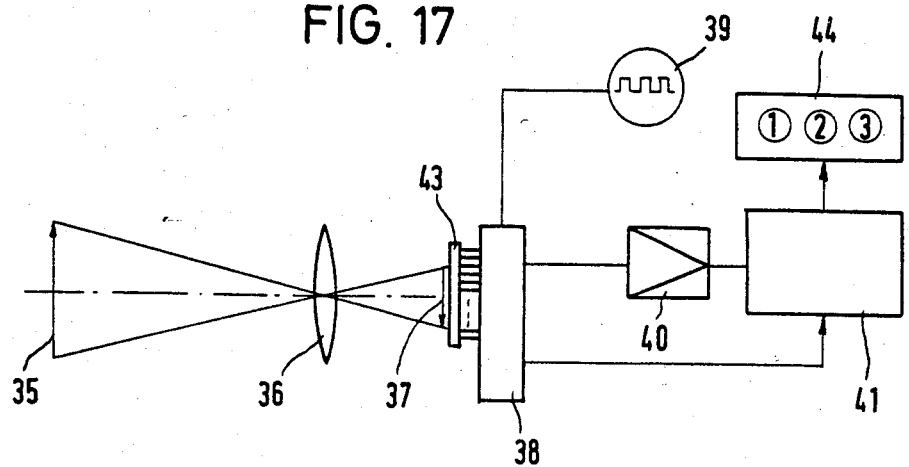
FIG. 17
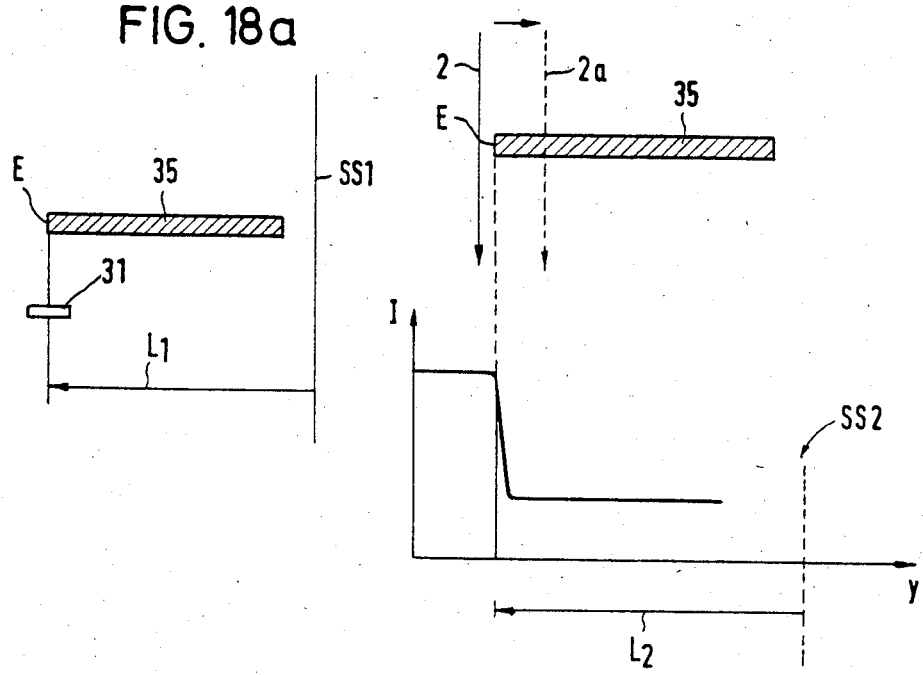
FIG. 18a
FIG. 18b

FIG. 22
FIG. 21
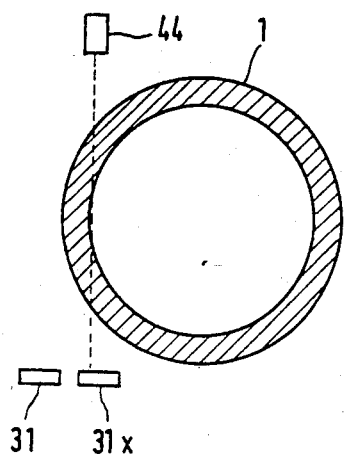
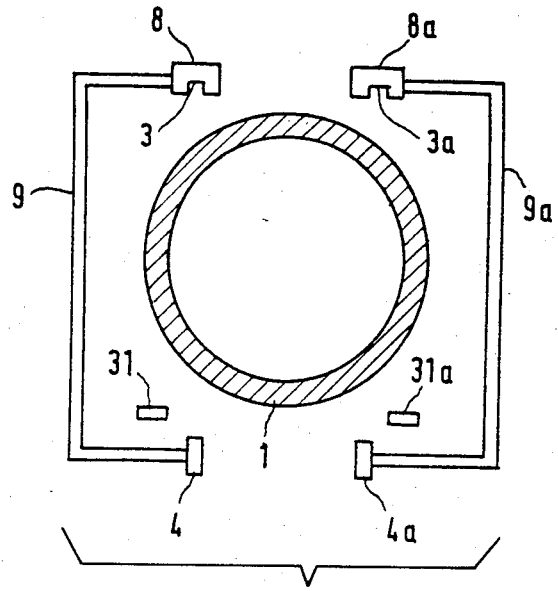
FIG. 23a
FIG. 23
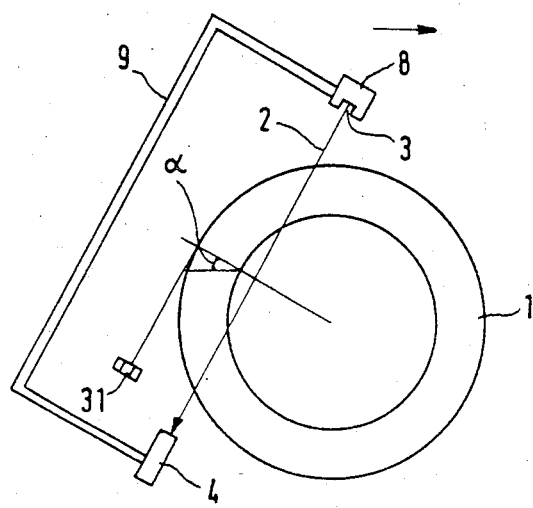
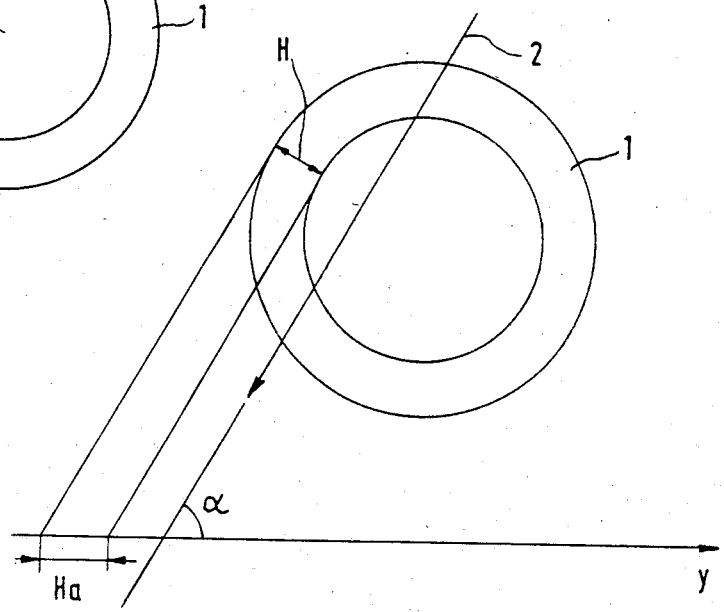

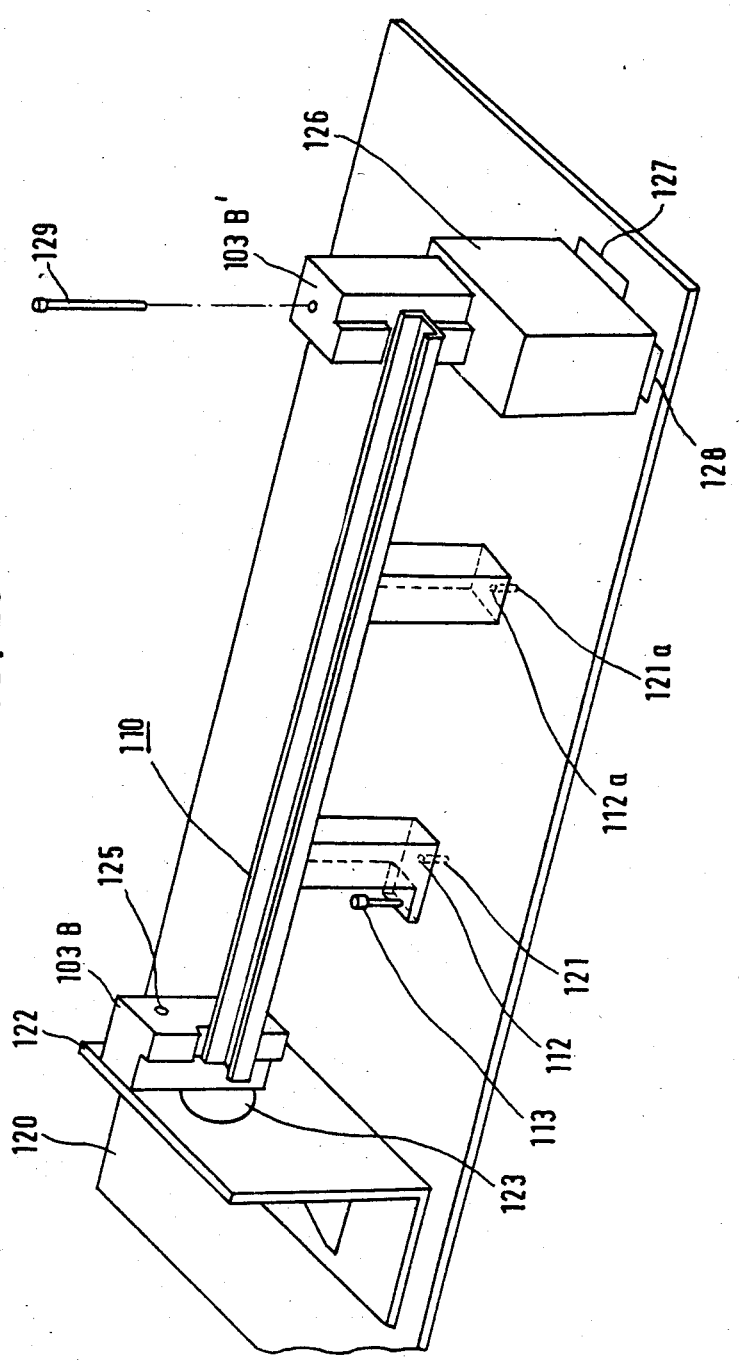

TUBE WALL THICKNESS MEASUREMENT

This application is a division of application Ser. No. 274,531, filed on June 17, 1981.

BACKGROUND

This invention relates to an improved method of gauging the wall thickness of a tubular object, such as a seamless steel pipe, in a non-contacting manner by the use of radiation.

When a beam of radiation, such as a gamma-ray, passes through a material the intensity of the radiation beam generally decreases with the distance, due to absorption or scattering of the beam in the material. The intensity of the radiation beam may be considered as the number of photons or radiation particles, and more specifically as the number of counts indicated by a radiation detector, and may be expressed as:

$$N = N_0 e^{-\mu x} \quad (1)$$

where N denotes the intensity of the radiation beam, $N_0$ is an initial value of the intensity at a position before the beam enters the material, e is the base of the natural logarithm, $\mu$ is an absorption coefficient, and x is the length of the transit path of the radiation beam across the material layer. The absorption coefficient $\mu$ is a value determined by the energy of the gamma ray and by the type of material being measured. For example, if the radiation source is caesium 137 having a gamma ray energy of 0.622 MeV and the material is iron, the coefficient $\mu$ is approximately 0.06 [1/mm].

More precisely, the above Equation (1) indicates an idealized formula, if the transit path length x is larger, it is modified and expressed as:

$$N = N_0 B e^{-\mu x} \quad (2)$$

where B is a regeneration factor. It may be expressed also as:

$$N = N_0 e^{-\mu x}, \quad \mu = \mu(x)$$

where $\mu$ is variable.

A method of gauging the wall thickness of a steel pipe using radiation is known from the 1979 Japanese patent application No. 114263 and is illustrated in FIGS. 1 and 2. The tube 1 the wall thickness of which is to be gauged is presumed to have true cylindrical and coaxial outer and inner peripheral surfaces having respective radii $R_1$ and $R_2$. A gamma ray beam 2 is used to scan the tube 1 by moving in the direction lateral to the axis of the tube 1.

The y-axis is set to coincide with the direction of the lateral movement of the gamma ray beam, and the y-coordinate is zero at the position corresponding to the center of the tube 1. The length of the path of the gamma ray beam across the tube wall is denoted as x, and N is the detected intensity of the gamma ray beam after it transits the pipe. The axis of the radiation beam is perpendicular to the y-axis. The value of x is thus expressed as:

$|y| \geq R_1 \quad x = 0$ $R_1 \geq |y| \geq R_2 \quad x = 2\sqrt{R_1^2 - y^2}$ $R_2 \geq |y| \geq 0 \quad x = 2(\sqrt{R_1^2 - y^2} - \sqrt{R_2^2 - y^2})$ The value of N is expressed as:

$|y| \geq R_1 \quad N = N_0$ $R_1 \geq |y| \geq R_2 \quad N = N_0 \exp(-2\mu \sqrt{R_1^2 - y^2})$ $R_2 \geq |y| \geq 0 \quad N = N_0 \exp(-2\mu \sqrt{R_1^2 - y^2} - \sqrt{R_2^2 - y^2})$ If the positions of the inflection points $S_1(y=R_1)$ and $S_2(y=R_2)$, or $S_3(y=-R_2)$ and $S_4(y=-R_1)$ of the curve showing the value of detected radiation beam intensity N can be determined, the examined tube wall thickness H may be expressed as the difference between them in the y-coordinate.

The above known method of gauging the tube wall thickness includes finding a point of minimum attenuation of radiation transmission where the radiation beam tangentially contacts the outer peripheral surface of the tube, and a point of maximum attenuation of radiation transmission where the beam tangentially contacts the inner peripheral surface of the tube. The distance therebetween is the tube wall thickness.

It is a disadvantage of this known method, however, that determining accurate positions of the points $S_1$ and $S_2$ or $S_3$ and $S_4$ requires a fairly long time. Also, inaccurate results may be obtained because it is not easy to determine the inflection points of the variation of detected radiation intensity during actual measuring operations.

To form sharp inflection points a very high resolution of the radiation beam is needed, which requires a radiation beam narrowed by a collimator assembly into as thin a beam as possible. With reference to FIG. 2, the gamma ray from a source 3 passes through a slit having a thickness $\Delta y$ of the first collimator member 5 near the source 3, to form a sector-shaped beam 2a. The slit of the second collimator member 5a near the detector 4 narrows the beam 2a into a thin beam having thickness of $\Delta y$. However, reducing the radiation beam thickness also reduces the radiation energy reaching the detector 4 per unit of time. Accordingly, a fairly long time is required for the measurement operation, during which time the measuring system (i.e. the radiation beam generating device and the detector) must be at a standstill in relation to the tube being examined.

Also, the indication of the detected radiation (except in X-ray measurement) generally is inevitably accompanied by error, referred to as a statistic noise, the value of which is proportional to $\sqrt{N}$, where N denotes indication of detected radiation. That is:

$$\frac{\text{the error}}{\text{the indication}} = \frac{\sqrt{N}}{N} = \frac{1}{\sqrt{N}}$$

Consequently, the larger the indication of detected radiation N, the smaller the relative error becomes. It is, therefore, necessary to have the amount of radiation energy reaching the detector greater than a certain minimum value to obtain an accurate measurement. For example, where a tube being examined has a wall thickness of 20 mm and a resolution of 0.1 mm is needed in its measurement, it is necessary to have more than 200 measuring points.

A collimator, as referred to above, includes a massive radiation shield formed, for example, of lead 50 mm or 100 mm thick. Assuming a straight hole is bored through the shield having a diameter of 0.5 mm through which the radiation beam passes (although this may be smaller than the smallest practicable diameter in a lead shield), and assuming the radiation source is caesium 137, the distance between the source and the detector is 600 mm, and the detection efficiency is 50%, then the radiation energy $N_0$ reaching the detector with no absorption material interposed between the source on the detector is approximately 683 cps (counts per second). To lower the statistic noise below about 1/500, the amount of radiation energy required to reach the detector is more than about $2.5 \times 10^5$ counts. Consequently, about 6 minutes is spent for one step of the measurement operation at each measuring point. Therefore, a complete process for obtaining a single value of the tube wall thickness comprising 200 measuring points requires about 20 hours.

As described above, the known method is impractical for actual tube wall thickness measurement, particularly in industrial processes for manufacturing long continuous tubular products, such as seamless steel pipes where a quick, on-line thickness measurement is required.

If X-rays are used instead of gamma rays, there is no statistic noise problem. However, X-rays result in a low detection efficiency, so that a relatively long time is required for the measurement operation to determine sharp inflection points.

It is an object of the present invention to eliminate the above disadvantages of the known method by providing a method of tube wall thickness measurement applicable to actual industrial processes for the manufacturing or inspecting of tubular products such as, for example, seamless steel pipes in hot rolling lines or in cold inspection lines, where each tubular product moves past the measuring equipment for a period of time not more than several ten seconds.

It is a further object of the invention that the measurement method be applicable to on-line operations.

SUMMARY OF THE INVENTION

In accordance with the present invention a sufficient amount of radiation energy must reach the detector in order to lower the relative error $$\left( \text{i.e. } \frac{\text{the statistic noise}}{\text{the detected indication}} \propto \frac{1}{\sqrt{\text{the detected indication}}} \right)$$

below a desirable small value. The indication of detected radiation is proportional to the integral of received radiation energy (in each unit of time and in each unit of surface area) over both the whole period of time of, and the whole surface area on which, the radiation beam is applied. In accordance with the invention, the use of a relatively large surface area to receive the radiation beam reduces the time period required to obtain the adequate indication of the detected radiation, unlike the known method wherein a relatively long period of time is required to obtain the same indication of detected radiation by using a smaller surface area to receive the radiation beam. The larger surface area is obtained by using a collimator slit having greater thickness than in the known method.

In the known method, the measuring equipment carries out one measuring step at a time, i.e. emitting a predetermined quantity of radiation, detecting the radiation while at a standstill with respect to the tubular object being examined, then moving a predetermined distance corresponding to a desired resolution, e.g., by 0.1 mm, then stopping and again measuring. The operation is successively repeated k times. The total measuring time to determine a single value of tube wall thickness becomes k times as long as the operation of shifting, position-setting, radiation emission and detection. This intermittent stopping during the measuring operation is dispensed with in the present invention.

Suppose, for example, that a time period for each sampling (i.e. the radiation emission and detection) is 0.1 second, that samplings take place at displacement intervals of 0.1 mm each, that each motion of shifting and position-setting of the measuring equipment takes more than 3 seconds (which may be somewhat shorter than practical, since this is usually considered not less than about one minute due to the lead shield), and that the total displacement distance for scanning is 40 mm. The total time period for measuring the tube wall thickness is:

$$40 \times 0.1 \text{ sec} + 40 \times 3 \text{ sec} = 124 \text{ seconds.}$$

The time required for moving and setting the measuring equipment is far greater than the net time required for emitting and detecting the radiation.

However, in accordance with the present invention, the lateral movement of the measuring equipment continues without stopping, so that sampling also is continuous. The time required for the measuring operation thus can be significantly shortened. Preferably, the data obtained by such non-stop scanning may be integrated or summed with respect to a predetermined time period to produce a set of discrete values i.e., quantized, or measured, data.

The quantized data obtained by this non-stop scanning operation can be expressed graphically by plotting it in a memory portion of an electronic computer as a graphic expression of time (or displacement) vs. analog indication when analog measurement is used, or some non-continuous graph of time (or displacement) vs. digital indication when digital measurement is used.

The line of the resulting graph has several inflection portions which can be detected electronically, for example, by monitoring a change in increment of the indication of detected radiation. The graph line, therefore, has a first portion appearing before the first inflection portion, a second portion appearing between the first and a second inflection portions, a third portion appearing after the second inflection portion, and so on. Each of the portions can be approximated by an equation. (The first portion may be a straight line represented only by a fixed number). By solving simultaneous equations or a differential equation derived from those approximate equations, the positions of the inflection points may be obtained, the distance therebetween determining the tube wall thickness.

For a better understanding of the present invention, together with other and further objects, reference is made to the following description taken in conjunction with the accompanying drawing, and its scope will be pointed out in the appended claims.

BRIEF DESCRIPTION OF THE DRAWINGS

FIG. 3 is an illustration of the first embodiment of the present invention with a graph associated therewith diagrammatically representing a set of data stored in a memory portion of a computer;

FIG. 6a is a chart of pulse and operation sequences of the circuit illustrated in FIG. 6;

FIG. 7 is an illustration similar to the illustration in FIG. 3 relating to the second embodiment of the present invention;

FIGS. 8, 9a and 9b are similar to the graph illustrated in FIG. 4 relating to the third embodiment of the present invention;

FIGS. 12 and 12a are diagrammatic illustrations for the fifth embodiment of the present invention similar to those illustrated in FIGS. 11 and 11a;

FIGS. 13 and 13b are diagrammatic illustrations for the sixth embodiment of the invention similar to those illustrated in FIGS. 11 and 11a;

FIG. 17 is a typical photoelectrical position detection device used in connection with the seventh embodiment of the present invention;

FIG. 18a, 18b and 18c are schematic illustrations to the position-setting operation of the equipment illustrated in FIG. 15;

FIG. 21 is an illustration of the eighth embodiment of the present invention;

FIG. 22. is an illustration of the ninth embodiment of the present invention:

FIG. 23 and 23a are illustrations of a modification of the invention applicable when the lateral movement of the radiation beam across the tube and the axial direction of the radiation beam are not perpendicular to each other;

FIGS. 24a–30 are illustrations of a device for improved collimator alignment in accordance with the present invention;

FIG. 24a is a perspective view of a two-part collimator member showing the two parts thereof connected;

FIG. 25b is a top view of the aligning ruler illustrated in FIG. 25a;

FIG. 26 is a perspective view of two collimators and the ruler assembled on a frame;

FIG. 26a is a partial view of the assembly illustrated in FIG. 26 at an intermediate stage during assembly;

FIG. 27 is a side elevational view of the assembly illustrated in FIG. 26;

FIG. 28 is a perspective view similar to the view illustrated in FIG. 26 showing an alternative embodiment;

FIGS. 29a and 29b are illustrations of another alternative embodiment of the aligning ruler;

FIG. 30 is still another alternative embodiment of the ruler.

DETAILED DESCRIPTION OF THE DRAWINGS

FIG. 3 is an illustration of the first embodiment of the present invention. A gamma ray beam 2 having a thickness $\Delta y$ scans a tube 1, is moved laterally at a constant speed v in the direction of arrow A across the tube 1. The intensity of the gamma ray beam 2 after it transits the tube is indicated by a radiation detector (not illustrated) and plotted in a conceptual graph in a memory portion of a computer, the ordinate representing the indication of the detected radiation, and the abscissa representing the position of the center line of the gamma ray beam 2 moving laterally across the tube. Thus, a graph line K is obtained.

The detector may be either analog or digital. If analog, it produces a continuously varying output; if digital, it produces a non-continuous but gradually varying output. Preferably, the detector output is led to integrating means, which may be a counter if the detector output is digital, which integrates the detector output over a predetermined fragmental period of time (or quantization period) T.

The quantized indication I of detected radiation is obtained per each period of time T, the gamma ray beam 2 shifting its position laterally by a distance of vT for each period of time T. That quantized value is plotted on the assumption that it occurs at the instant when the gamma ray beam 2 has moved by a certain percentage within the particular fragmental period of time T, for example, on the assumption that the quantized indication I of detected radiation is obtained at the middle point of each lateral displacement of the gamma ray beam 2 within the fragmental period of time T. Thus the graph line K is obtained.

The line K begins with a first straight portion before the gamma ray beam 2 contacts the outer peripheral surface of the tube 1. There next appears a first inflection portion, followed by a second curved and drooping portion, a second inflection portion, and then a third curved and rising portion. The very beginning of the first inflection portion is an ideal inflection point and indicates that the right edge (in FIG. 3) of the gamma ray beam 2 has just contacted the outer peripheral surface of the tube 1. This ideal point $E_1$ is the position of the center of the gamma ray beam 2 at this instant in time.

The very beginning of the second inflection portion also is an ideal inflection point and indicates that the right edge of the gamma ray beam 2 has just contacted the inner peripheral surface of the tube 1. Ideal point $E_2$ is the position of the center line of the gamma ray beam 2 at the very beginning of the second inflection portion. $R_1'$ and $R_2'$ are the respective coordinates of the ideal points $E_1$ and $E_2$ on the abscissa. The difference between the coordinates $R_1'$ and $R_2'$ is the wall thickness of the tube 1. (The broken line following the point $E_2$ shows a result which would be generated if the tube 1 were solid rather than hollow.

Figure 4:
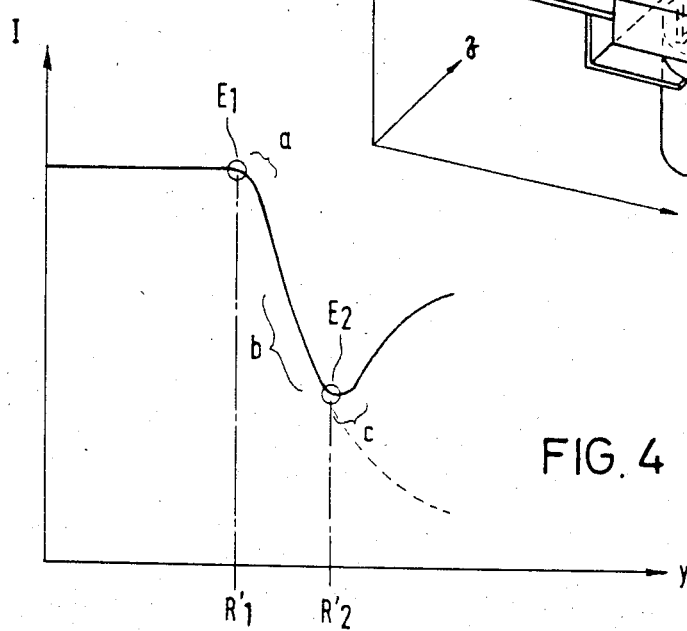
FIG. 4 is a graph similar to the graph in FIG. 3.

FIG. 4 is a graph line identical to the line K in FIG. 3 and will be used to further describe the first embodiment of the invention. The lateral movement of the radiation beam is at a constant speed during the effective measurement operation. A relatively narrow portion "a" of the curve following the point $E_1$ where the plotting begins to generate a first sudden variation in the increment of the detected radiation is analyzed electronically and approximated by a first equation. (The variation in increment may be understood as a secondary differential, if the measurement is analog and no quantization takes place). A relatively wide portion "b" of the curve preceding the point $E_2$ where the plotting begins to generate a second sudden variation in the increment of detected radiation is analyzed and approximated by a second equation. Also, a relatively narrow portion "c" of the curve following the point $E_2$ is analyzed and approximated by a third equation. Suppose the first approximate equation is quadratic and represented by:

$$I = Ay^2 + By + C$$

while the second and third approximate equations are represented by:

$$I = exp(ay^2 + by + c)$$

and $$I = exp(dy^2 + ey + f)$$

respectively. The coefficients A, B, C, a, b, c, d, e and f can be determined algebraically, or by using the method of least squares, from the measured data being plotted.

The point $E_1$ resides where the curve "a" starts from a flat straight line. Therefore, the y-coordinate $R_1'$ of the point $E_1$ can be obtained by differentiating the first approximate equation with y, and solving an equation of the differential being equal to zero. That is, the value of y, which satisfies $\partial I/\partial Y = 0$, is $R_1'$. In a coordinate system where $y = 0$ at the center of the tube 1, a relation $$|R_1'| = R_1 + \Delta y/2 + vT/2$$

holds, where $R_1$ is the outer radius of the tube 1, and provided that each quantized value of detected radiation being plotted occurs at the middle point of that lateral displacement of the gamma ray beam 2 within each fragmental period of time T as aforementioned (whereby the term vT/2 is produced).

The other point $E_2$ is approximately an intersection of the two lines represented by the second and third approximate equations:

$$exp(ay^2 + by + c) = exp(dy^2 + ey + f)$$

that is $$ay^2+by+c=dy^2+ey+f$$

or $$(a-d)y^2+(b-e)y+c-f=0.$$

The obtained value of y determines the coordinate $R_2'$ of the point $E_2$. Similarly, as in $R_1'$, the relation $$|R_2'|=R_2+\Delta y/2+\nu T/2$$

holds, where $R_2$ is the inner radius of the tube 1. Therefore, the wall thickness H of the tube 1 is:

$$H=|R_1'|-|R_2'|.$$

Results of actual measurement tests of tube wall thickness in accordance with the first embodiment are listed Table 1.

TABLE 1

| Case | Inside radius (mm) | | Outside radius (mm) | | Wall thickness (mm) | | Error (mm) |
|---|---|---|---|---|---|---|---|
| | Actual | Measured by radiation | Actual | Measured by radiation | Actual | Measured by radiation | |
| 1 | 140 | 140.112 | 150 | 149.910 | 10 | 9.798 | 0.202 |
| 2 | 187 | 187.079 | 208 | 207.916 | 21 | 20.817 | 0.813 |
| 3 | 93 | 93.024 | 96 | 95.902 | 3 | 2.878 | 0.122 |

In the examples listed in Table 1 the radiation source is caesium 137, the tube material is iron, the radiation beam thickness is 2 mm, the radiation beam width (in the direction parallel to the tube axis) is 5 mm, the data sampling period (i.e. the abovementioned fragmental or quantization period of time T) is 0.1 second and the lateral displacement velocity of the radiation beam relative to the tube body is 10 mm/sec. The manner of data sampling is multisampling, i.e., where each of elemental output data of the radiation detector is picked up at a time interval of 0.01 second. Multisampling will be described more fully below in conjunction with FIG. 6a part i, and in relation to the performance of the scale device 13 also described below.

As indicated in Table 1, the first embodiment offers an effective and practical method of tube wall thickness measurement.

The accuracy of the measurement results can be further improved by using a comparison-calibration method known per se in the art. Various referential data as to relations between known wall thicknesses of known sample tubes, and the measurement results by the above method, are experimentally produced and stored in a memory portion of an electronic computer and sorted according to dimensions of their outer diameters and their wall thicknesses before the tubes of unknown thickness are examined. Outer diameters of these examined tubes can be gauged easily by radiation measurement, or by some other appropriate means.

Calibration of measured results of the thicknesses of the tube wall being examined can be performed using the referential data stored in the computer memory, referring to the sorted dimensions of outer diameters of tubes. The measurement error can be significantly reduced by preparing an adequate variety of referential data having fine pitches of dimensional intervals among them. As a practical matter, the measurement error may be set, for example, within a range of between 10 μm and 30 μm.

Figure 1:
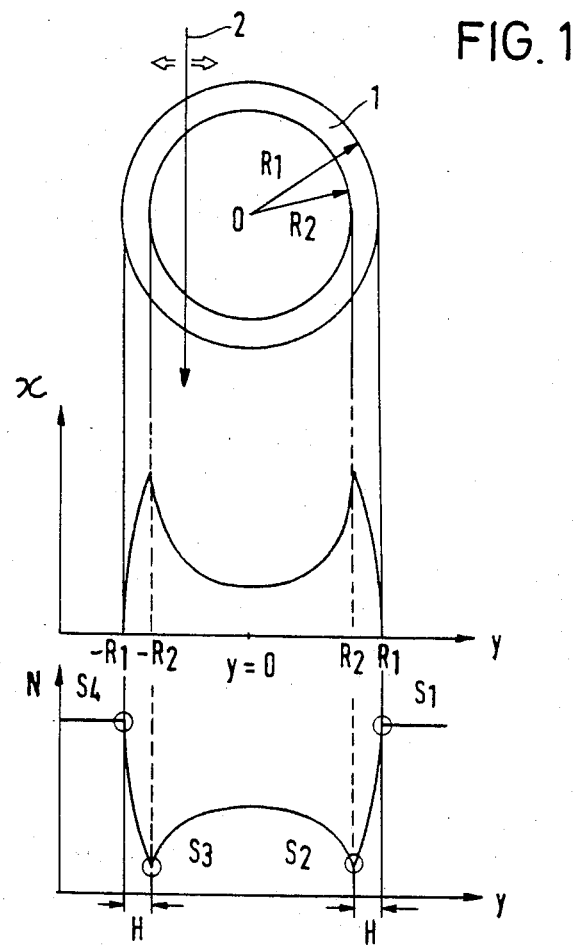
FIG. 1 is an illustration showing a known general principle of tube wall thickness measurement using a radiation beam.
Figure 2:
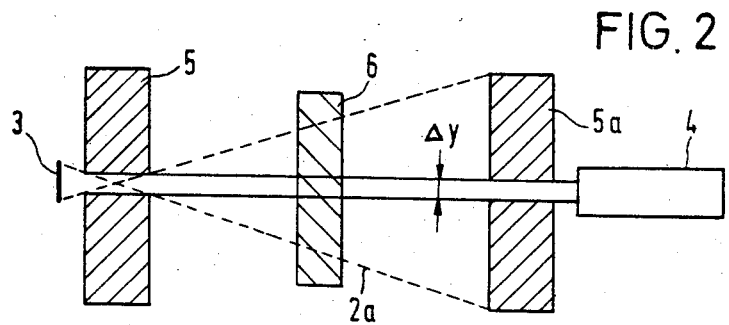
FIG. 2 is a schematic illustration of a known typical collimator assembly used to narrow down a radiation beam.
Figure 5:
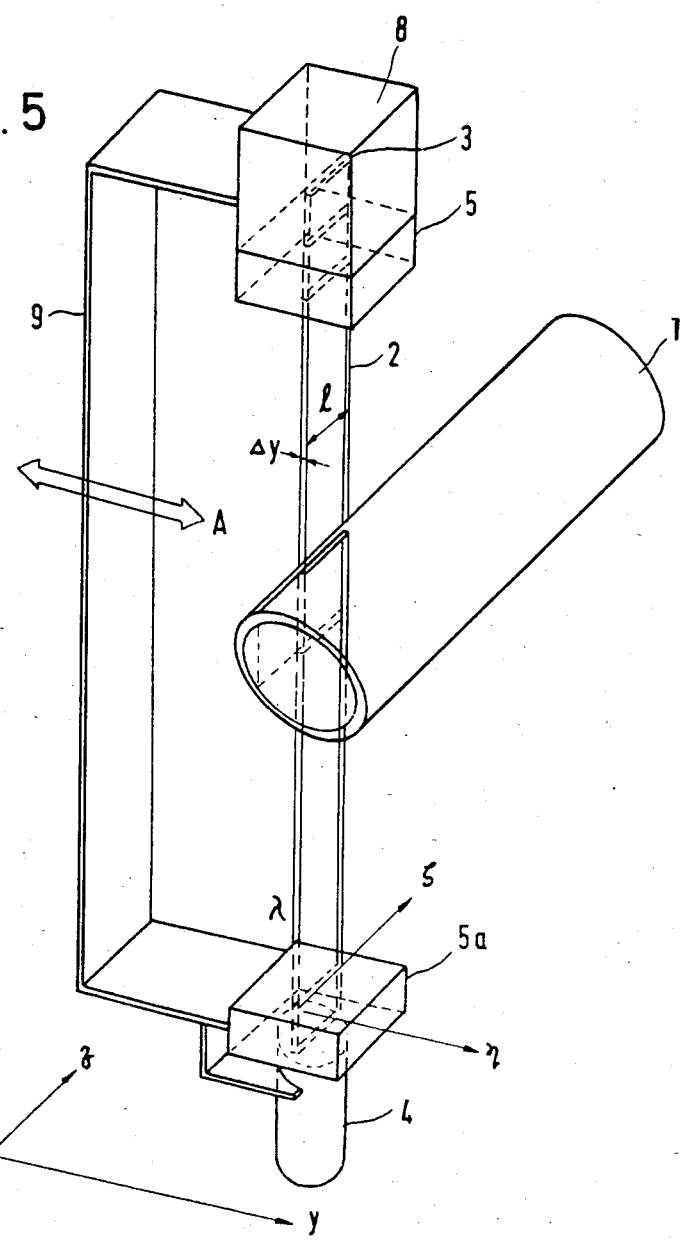
FIG. 5 is a perspective view of measuring equipment substantially similar to a conventional apparatus but having a larger collimator slit (i.e., a larger radiation beam thickness Δy)

FIG. 5 is a perspective view showing the measuring equipment used in accordance with the first embodiment of the invention. It comprises a radiation source container 8 with a first collimator 5 mounted to the upper end of a frame 9, and a radiation detector 4 with a second collimator 5a mounted to the lower end of the frame 9. A gamma ray radiation source 3, which may be caesium 137, for example, is enclosed in the container 8 to produce a radiation beam 2 passing through the slit of the first collimator 5. The radiation beam 2 is transmitted across a tube body 1, passes through the slit of the second collimator 5a, and reaches the detector 4. The radiation beam 2 has a thickness Δy and a width l. During the scanning operation the frame 9 moves in the direction of arrow A.

Lines y, z and r indicate an orthogonal coordinate system which is stationary relative to the tube 1. The y, z and r axes are parallel to the arrow A, the tube axis and the radiation beam axis, respectively. Lines η, ζ and λ indicate another orthogonal coordinate system fixed to the measuring equipment. The η, ζ and λ axes are parallel to the y, z and r axes, respectively.

The radiation beam 2 has a uniform radiation flux intensity at each sectional surface area parallel to the y-z surface (or the η−ζ surface) which is perpendicular to the radiation beam 2 axis. The variation in intensity of the radiation of the source 3 with respect to time is negligible because the half-life period of the radiation source 3 is very long. The radiation flux intensity n of the gamma ray is expressed as:

$$n=n_0 e^{-\mu x}$$

where $n_0$ denotes the radiation flux intensity when the tube body is removed, and x is the length of the transit path of the radiation flux line across the tube body, the value of x being a function of the y-coordinate of the radiation flux line. The quantized indication I of detected radiation is an integration of the flux intensity n over an area of Δy×l (i.e., the section of the radiation beam) and over that fragmental period of time T (i.e. a unitary period of data sampling). Specifically, the quantized value of the detected radiation $I_0$ in the absence of the tube 1 is expressed, using x=0, as:

$$I_0 = \epsilon \int_0^T \int_0^l \int_{-\frac{\Delta y}{2}}^{+\frac{\Delta y}{2}} n_0 \, d\eta \, d\zeta \, dt = \epsilon \cdot T \cdot l \cdot \Delta y \cdot n_0$$

where $\epsilon$ is a constant, and $l$ and $\Delta y$ are the width in a z-direction and the thickness in y-direction, respectively, of the radiation beam 2.

When $x \neq 0$, if it is assumed the integration of the measured output of radiation flux intensity n begins at a time instant t and is ended at a time instant $t+T$, then the quantized value of the detected radiation I is expressed as:

$$I = \int_{t_1}^{t_1+T} \int_0^l \int_{-\frac{\Delta y}{2}}^{+\frac{\Delta y}{2}} n_0 e^{-\mu x} \, d\eta \, d\zeta \, dt$$

$$= \epsilon n_0 l \int_{t_1}^{t_1+T} \int_{-\frac{\Delta y}{2}}^{+\frac{\Delta y}{2}} e^{-\mu x} \, d\eta \, dt.$$

And using $y = y_1(t) + \eta$, where $y_1(t)$ is the y-coordinate of the origin ($\eta = 0, \zeta = 0, \lambda = 0$) of the moving $\eta \zeta \lambda$-coordinate system at a time instant t, the quantized value of the detected radiation I can be expressed as:

$$I = \epsilon n_0 l \int_{t_1}^{t_1+T} \int_{y_1(t) - \frac{\Delta y}{2}}^{y_1(t) + \frac{\Delta y}{2}} e^{-\mu x} \, dy \, dt.$$

Here, quantized values of the detected radiation I are obtained in the form of dispersed data appearing at time intervals T as the gamma ray radiation beam 2 moves in the y-direction, and each of the values is the integration over the period T. It should be noted that the gamma ray radiation beam 2 used here has a greater thickness and width than the gamma ray radiation beam used in conventional techniques to obtain accurate measurement results, or to determine the positions of the inflection points in the plotted data.

Figure 6:
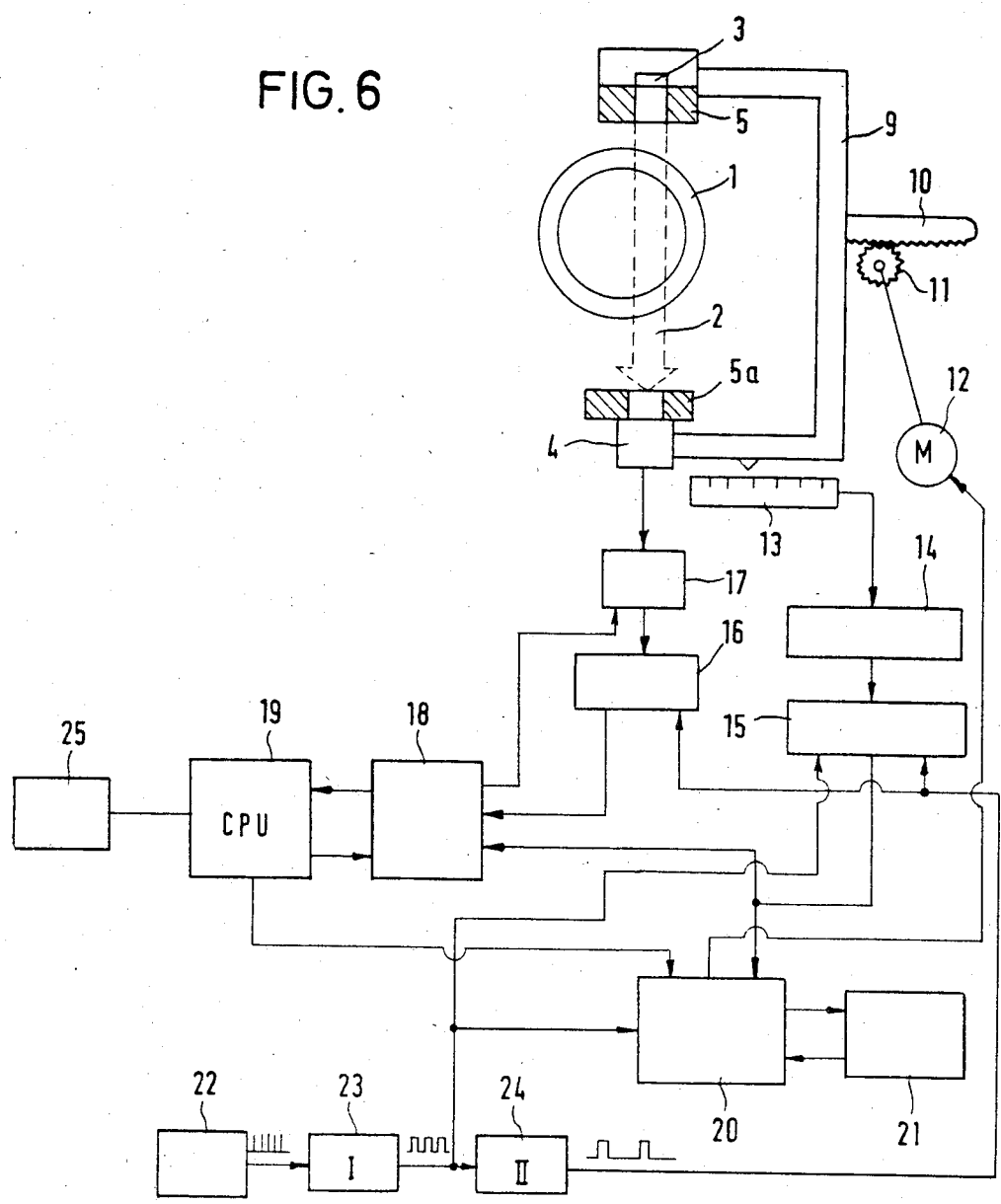
FIG. 6 is a schematic illustration of the measuring equipment illustrated in FIG. 5 and its associated electronic circuit in accordance with the present invention.

FIG. 6 is a schematic illustration of the measuring equipment illustrated in FIG. 5 with an associated electronic circuit and a drive mechanism. The frame 9 is provided with a rack 10 which engages a pinion 11. When a motor 12 operates to drive the pinion 11 the rack 10 moves, thereby laterally moving the system comprising the radiation source 3, the radiation beam 2 and the radiation detector 4 to scan the tube 1.

A scale 13 determines the position of the measuring equipment relative to the tube 1, and a position indicator 14 indicates that position as an electrical output. The electronic circuit further comprises a counter 17 which is connected to receive the output of the detector 4, latch circuits 15 and 16, and a central processor unit (CPU) 19 for processing the measured data having an interface 18 associated therewith. Also provided are an auxiliary processor unit 21 to control the operation of the motor 12 and an auxiliary interface 20 associated therewith, a clock pulse generator 22, first and second frequency-dividers 23 and 24, respectively, and an input/output device 25.

Referring to FIGS. 6 and 6a, during the measuring operation the CPU 19 produces a scan-initiation signal, which is sent through the auxiliary interface 20 to the auxiliary processor unit 21, and in response to which the auxiliary processor 21 produces a signal sent through the auxiliary interface 20 to initiate the operation of the motor 12, and thus the scanning motion, via the pinion 11 and the rack 10.

The clock pulse generator 22 produces clock pulses, as shown in FIG. 6a part a, received by the first frequency divider 23 which produces pulses, as shown in FIG. 6a part b, at a predetermined interval, for example, 1/200 second. The latch circuit 15 is arranged to read and store the indication of the position indicator 14 represented by the pulse-shaped line as shown in FIG. 6a part c, and to receive the output pulses of the first frequency divider 23. The latch circuit 15 is responsive to each of the pulses to renew the storage of data.

In response to each output pulse of the first frequency divider 23, the auxiliary processor unit 21 reads the output of the position indicator 14 and utilizes the data to control the operation of the motor 12 to thereby maintain the speed of the frame at a 9 constant during the scanning operation.

The second frequency divider 24 receives the output pulses of the first frequency divider 23 to produce further demultiplied clock pulses, as shown in FIG. 6a part d at another predetermined time interval, for example, 0.1 second.

The radiation beam 2 from the source 3 is directed through the first collimator 5, transmitted across the tube body 1, passes through the second collimator 5a, and reaches the detector 4. The detector 4 has a built-in amplifier and produces output voltage pulses shaped in waveform, the number of which is proportional to the number of radiation particles (or the quantity of radiation, or the detected intensity N of radiation) reaching the detector. The output pulses of the detector 4 are counted by the counter 17. The latch circuit 16 reads and stores the output of the counter 17, and renews it whenever a clock pulse as shown in FIG. 6a, part d is produced by the second frequency divider 24 at the predetermined interval, thus quantizing the output of the detector 4.

The output of the counter 17 is represented by a pulse-shaped line as shown in FIG. 6a part e. When the latch circuit 16 has renewed its storage, the interface 18 produces a reset pulse signal, as shown in FIG. 6a part f, to reset the counter 17 so that the counter 17 begins its counting operation again from zero. At the same time, the interface 18 produces a read command pulse signal for the CPU 19, which in response to the read command pulse signal, reads the number of count (i.e. the quantized indication of detected radiation I) stored in the latch circuit 16 and the position indicator output stored in the latch circuit 15, and sorts them in a memory portion.

In FIG. 6a part g, the raised portion of the line shows the period of time within which the counting operation of the counter 17 occurs, while the depressed portion of the line shows the period of time during which the counter 17 is cleared. A pulse-shaped portion of the line in FIG. 6a, part h represents the period of time during which the count stored in the latch circuit 16 is read and the position indication stored in the latch circuit 15. FIG. 6a part i relates to the multisampling technique which will be described more fully below.

The measuring procedures are repeated until the CPU 19 determines the end of the scanning operation, for example, by finding that the measuring equipment has moved a predetermined distance from its starting point, or that a predetermined period of time after the second inflection in the increment of the detected radiation has elapsed, or by finding that the indication of detected radiation is at a constant equal to that at the beginning of the scanning operation. The CPU 19 thereafter sends a scan-ending signal through the auxiliary interface 20 to the auxiliary processor unit 21 to stop the motor 12 and thereby stop the lateral movement of the measuring equipment. A reverse operation of the motor 12 is then initiated by appropriate commands of the CPU 19, the auxiliary interface 20 and the auxiliary processor unit 21.

In the first embodiment, the control of the speed of the motor 12 occurs intermittently at the predetermined time interval defined by the first frequency divider 23. The time interval, for example, of 1/200 second is, however, far shorter than that at which the latch circuit 16 picks up the counts of counter 17, and which is defined by the second frequency divider 24, for example, of 0.1 second. The running speed for the scanning operation, therefore, may be adequately regulated to a constant.

Thus, the data of the detected radiation varying with time (or position) are stored in the memory of the CPU 19, and operations are performed thereby to solve the abovementioned equations, to thereby determine the value of tube wall thickness. An output of the wall thickness value is produced through the input/output device 25.

The scale 13 may be a digital, or so-called linear, scale available on the market. The scale 13 is highly accurate and has a quick measuring performance, with a response time of about several milliseconds, or about 1 mm/sec. at its quickest. This response time is sufficient for the measuring equipment in the present invention since the highest response time for the measuring equipment necessary to obtain the time period of about several seconds of scanning per one output value of tube wall thickness is about several ten mm/sec.

The wall thicknesses of seamless steel pipes usually do not exceed 40 mm. The shortest practicable data-sampling period T (i.e. the quantization period) is about 0.1 seconds if using a radiation source of the largest present practicable power. Thus, the response time of the above digital or linear scale is so high that the time interval $\Delta t$, during which the position of the laterally moving radiation beam is read, can be far shorter than the period T during which the data of detected radiation is sampled. For example, the time interval $\Delta t$ may be about 0.01 second, while the data-sampling period T may be about 0.1 second.

The multisampling technique, therefore, can be used. In accordance with this technique, plural sets of counters 17 and latch circuits 16 are used. Each set produces a series of sampled data, the cycles of their data sampling phases shifted by a certain lapse of time from one another, for example, by the time interval $\Delta t$ (0.01 sec. in the above example, as shown in FIG. 6a, part 8). There, S1 is a time span of the duration T within which data associated with a first series is derived from the detected radiation intensity values; S2 is a second time span also of the duration T, which begins the time interval $\Delta t$ behind the first time span S1, and within which data associated with a second series is derived from the detected radiation intensity values; S3 is a third time span beginning the time span $\Delta t$ behind time span S2, and so on. Accordingly, finer data may be obtained, resulting in improved accuracy of measurement.

The CPU 19 may be provided further with a program to determine the presence of an improper motion of the measuring equipment. For example, where the speed of lateral movement of the scanning equipment is 10 mm/sec., the unitary period T of data sampling is 0.1 second, and the maximum allowable irregularity of the equipment speed is 0.5%, the CPU 19 determines any occurrence when a value of $$\frac{|y_1(t_1) - y_1(t_1 + 0.1 \text{ sec})|}{10 \text{ mm/sec} \times 0.1 \text{ sec}}$$

is greater than 1.005 or less than 0.995 mm/sec., and produces a signal indicative of the improper motion.

The motor 12 is preferably a braked motor, i.e., a motor which during rotation is braked to prevent reverse rotation, thus assuring the smooth movement of the measuring equipment.

FIG. 7 is an illustration similar to the illustration of FIG. 3 and related to the second embodiment of the invention. In the first embodiment, as shown in FIGS. 3 and 4, the points $E_1$ and $E_2$ denote the positions of the radiation beam 2 where the right edge of the radiation beam 2 contacts with the outer or inner peripheral surface of a tube wall to determine the wall thickness. In the second embodiment points $E_1'$ and $E_2'$ are used, point $E_1'$ indicating the position of the radiation beam 2 when its left edge contacts the outer peripheral surface of the tube wall, and point $E_2'$ indicating when the left edge of the beam contacts the inner peripheral surface of the tube wall. In the second embodiment, therefore:

$$|R_1''| = R_1 - \frac{\Delta y}{2} - \frac{vT}{2}$$

$$|R_2''| = R_2 - \frac{\Delta y}{2} - \frac{vT}{2}$$

where $R_1''$ and $R_2''$ are respective y-coordinates of the points $E_1'$ and $E_2'$.

$R_1''$ and $R_2''$ are determined in a manner substantially similar to that of the first embodiment by solving simultaneous equations derived from four otherwise defined approximate equations: the first equation representing the relatively narrow portion of the curve similar to that of curve "a" in FIG. 4; the second equation representing a relatively wide portion of the curve following the first curve similar to curve "a"; the third equation representing the relatively narrow portion of the curve similar to that of curve "c" in FIG. 4; and the fourth equation representing a relatively wide portion of the curve following the curve similar to curve "c". The points $E_1'$ and $E_2'$ are determined as intersections of the first and second, and of the third and fourth approximate equations, respectively.

In a third embodiment of the present invention, the first and second inflection points of the above mentioned graph line, formed by conceptually plotting the data of detected radiation beam intensity, are determined as intersections of still otherwise defined first, second and third portions of the graph line. The first portion appears before the first inflection portion of the graph line, which is actually a flat straight line; the second portion appears between the first and second inflection portions; and the third portion appears after the second inflection portion. The inflection portions may be detected, for example, electronically.

FIG. 8 is an example of measurement results using the third embodiment, the abscissa indicating the y-coordinate of the radiation beam axis (provided that $y=0$ at the tube axis), the ordinate indicating the quantized value of detected radiation I, and the small blank circles indicating the plotted data. In this example the radiation source is caesium 137; the radiation beam has a thickness $\Delta y$ of 2 mm; the speed of the lateral movement of the measuring equipment is a constant 10 mm/sec. in relation to the tube; the data-sampling period T (i.e. the quantization period) is 0.1 second; and the actual dimensions of the tube being examined are 300 mm in diameter and 10 mm in wall thickness.

As seen in FIG. 8, the untreated data as plotted indicate two inflection portions rather than clear inflection points. The first portion of the graph line is a straight line represented by $I=I_0$, where $I_0$ is the quantized value of detected radiation I in the absence of the tube body. The value of $I_0$ can be measured accurately beforehand. The second portion of the graph line appearing between the two inflection portions may be approximated by a function of curve Fa, and the third portion of the graph line appearing after the second inflection portion may be approximated by a function of curve Fb.

Figure 9B:
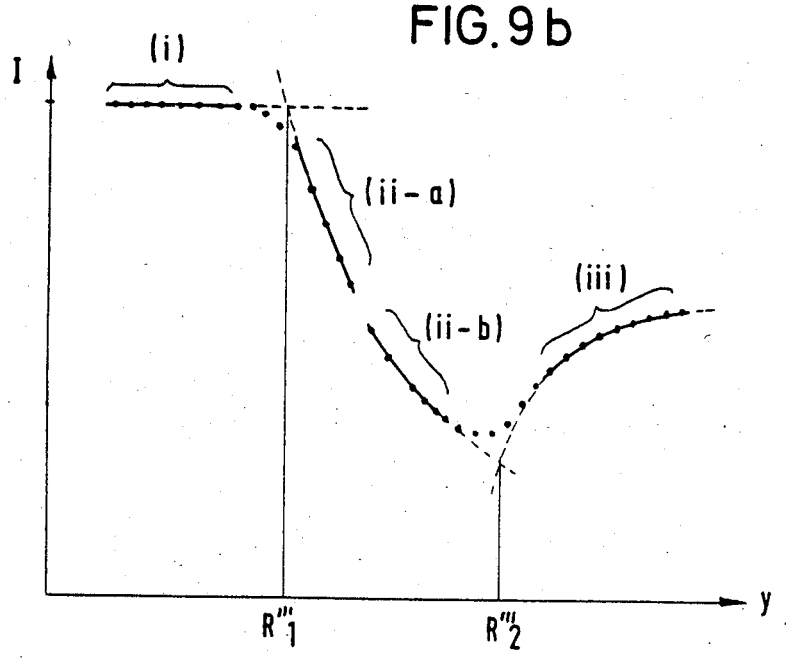
Figure 9A:
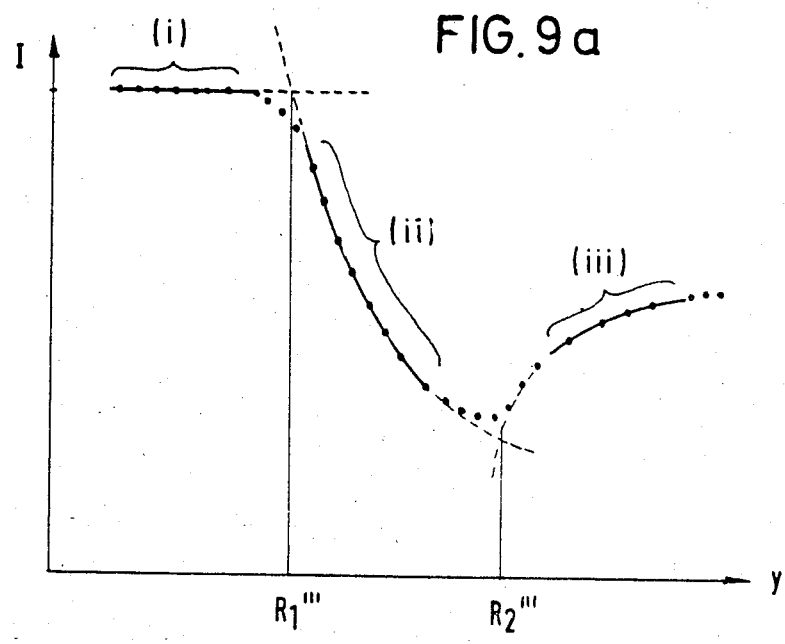

Referring now to FIG. 9a, which is a recapitulation of the data plotted in FIG. 8, the first portion (i) is that represented by $I=I0$. The function of curve Fa to approximate the second portion (ii) may be represented such as:

$$I=I_0 exp(ay^2+by+c) \qquad (*)$$

and the function of curve Fb to approximate the third portion (iii) may be represented by such as:

$$I=I_0(Ay^6+By^5+Cy^4+Dy^3+Ey^2+Fy+G) \qquad (**)$$

The coefficients a, b, c, A, B, C, D, E, F and G may be determined algebraically or by using the method of least squares from the measured data being plotted.

Therefore, the y-coordinate $R_1$ of the intersection of elongations of the first and second portions (i) and (ii) can be obtained easily by using $I=I_0$ in Equation (*), i.e., by solving $$exp(ay^2+by+c)=1, \text{ or}$$

$$ay^2+by+c=0.$$

If the function of curve Fa is represented by a more complicated form of equation rather than Equation (*), the coordinate of the intersection may be determined by using another method, for example, the Newton-Raphson method. The y-coordinate $R_2'''$ of the intersection of elongations of the second and third portions, (ii) and (iii) respectively, may be determined by solving the simultaneous equations (*) and (**), and also by using the Newton-Raphson method.

The difference between the values of $R_1'''$ and $R_2'''$ is the tube wall thickness.

Results of actual measurement tests of tube wall thickness in accordance with the third embodiment of the present invention are listed in Table 2.

TABLE 2

| Case | Inside radius (mm) | | Outside radius (mm) | | Wall thickness (mm) | | Error (mm) |
|---|---|---|---|---|---|---|---|
| | Actual | Measured by radiation | Actual | Measured by radiation | Actual | Measured by radiation | |
| 1 | 140 | 140.087 | 150 | 150.241 | 10 | 10.147 | 0.147 |
| 2 | 187 | 187.222 | 208 | 208.992 | 21 | 21.770 | 0.770 |
| 3 | 93 | 92.973 | 96 | 95.961 | 3 | 2.988 | 0.012 |

In these tests the radiation source is caesium 137; the tube material is iron; the radiation beam thickness is 2 mm; the radiation beam width is 5 mm; and the data sampling period T (quantization period) is 0.1 second. The lateral displacement velocity v of the radiation beam 2 relative to the tube body 1 is 10 mm/second in cases 1 and 2, and 2.5 mm/second in case 3. The results clearly indicate the effectiveness of the third embodiment and its practical application to an actual process.

Similar to the first or second embodiments, further improved accuracy may be obtained in the third embodiment by using the method of comparison-calibration. The second section (ii), as illustrated in FIG. 9a, may be considered as comprising two portions (ii-a) and (ii-b) approximated by respective equations:

$$I=I_0 exp(a_1y^2+b_1y+c_1) \qquad (*1)$$

and $$I = I_0 \exp(a_2 y^2 + b_2 y + c_2) \qquad (*2).$$

As illustrated in FIG. 9b, the coordinates $R_1'''$ and $R_2'''$ may be determined as the intersection between $I=I_0$ and Eq. (*1), and the intersection between Eq. (*2) and Eq. (**), respectively.

The measuring equipment and its associated electronic circuit as illustrated in FIGS. 5 and 6 may be used in the second and third embodiments, and performs similarly as in the first embodiment.

There are several advantageous features of the invention as described above. First, the invention does not require as particularly high a radiation power source as does the conventional technique to obtain sufficiently rapid measurement responses, owing to the thickness of radiation beam used in accordance with the invention. For example, in the above-described embodiments of the invention, when the collimator slit has a thickness of 2 mm and a width of 50 mm, the distance between the radiation source and the detector is 600 mm, the detection efficiency is 50%, and the unitary period of data sampling T is 0.1 second, a radiation power of 7.2 Ci will suffice to produce $2.5 \times 10^5$ counts/second of radiation using caesium 137 as the source material. A similar effect may be obtained, using X-rays.

Second, if the running speed is 10 mm/second and the scanning distance is 40 mm, for example, then the overall time period for measuring the wall thickness of a tube is 40/10=4 seconds, which may be said to be a relatively rapid measurement. Accordingly, on-line or real-time operations can be realized in tube wall thickness measurement in accordance with the invention.

The scanning distance of 40 mm in the above example was selected because the expected maximum outer diameter of the usual seamless steel pipe being examined is assumed to be 168.3 mm, according to a Japanese Industrial Standard, and an expected maximum value of the wall thickness of the pipe is approximately 10% of the outer diameter, i.e., about 17 mm. Therefore, the net scanning distance ordinarily is not more than about 20 mm plus about 10 mm each at both ends of the pipe, i.e., about 40 mm. The 10 mm on either end of the pipe are for running the measuring equipment up to its predetermined constant speed, and for decelerating the equipment from the end of the net scanning distance until the equipment is at a standstill.

In the above example the transit path length of the radiation beam across the tube is a maximum of about 101 mm, which is below the usually recognized maximum of approximately 110 mm or 120 mm for iron being gauged using caesium 137 as a source.

While in the above embodiments the speed of the lateral movement of the radiation beam is maintained at a constant during the effective measurement operation, the invention may also be used wherein the speed of lateral movement the radiation beam is not a constant, or further, in a system wherein the running speed may be varied intentionally during the measurement operation, as will be described below.

It is a feature of the fourth embodiment of the invention that the relation between the shifting position of the radiation beam and time is stored, i.e., the positions of the laterally moving radiation beam are measured with reference to time before the data sampling of detected radiation. Specifically, the positions are measured at much finer predetermined time intervals than the unitary fragmental period (i.e. quantization period) of time T. The obtained data of shifting beam-position vs. time are then plotted into a conceptual graph and may be stored or plotted in a subsidiary memory portion of an electronic computer. Thereafter, the sampling and quantizing of the indication of detected radiation is performed in a manner substantially similarly to aforementioned embodiments.

The data which is to be plotted is produced at the predetermined fragmental (quantization) time periods T, however, the scale of the transversal axis used in plotting this data is translated from duration of time into displacement of position by using the beam-position vs. time data stored in the subsidiary memory portion. The quantized indications detected radiation I data are then stored in the main memory portion of the electronic computer with reference to the shifting position of the radiation beam.

Figure 10:
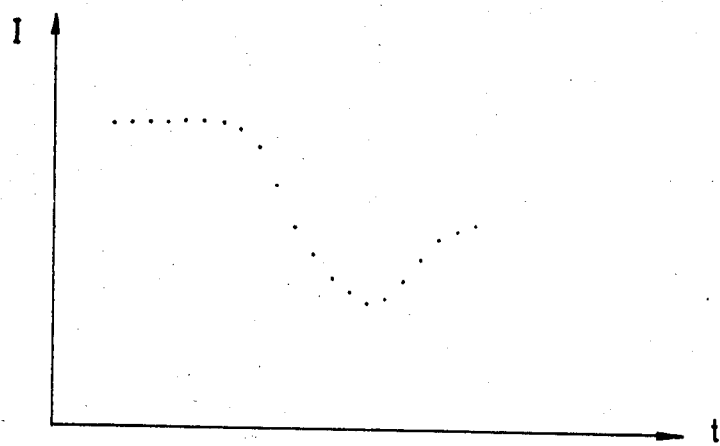
FIGS. 10 and 11 are diagrammatic illustrations of a set of intensity-vs.-time data stored in a main memory portion of a computer in the fourth embodiment of the present invention.

The operation of the fourth embodiment of the invention will be described more fully with reference to FIGS. 10 and 10a. FIG. 10 shows a graph line similar to the graph line illustrated in FIG. 4, the ordinate representing the detected radiation, but differing in that the abscissa is a scale of time. While in the former embodiments the displacement of the radiation beam was in straight linear proportion to time during the effective measurement, the abscissa therefore representing displacement as a distance, in the fourth embodiment the displacement of the radiation beam may not be in linear proportion to time even during the effective measurement. Therefore, the abscissa of the graph in FIG. 10 is on a scale of time and not displacement. The graph may be conceptual and stored in a main memory portion of an electronic computer.

Figure 10A:
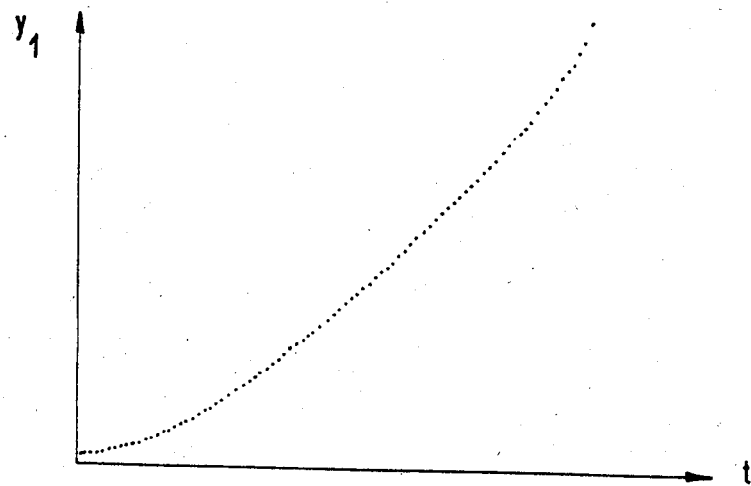
FIGS. 10a and 11a are diagrammatic illustrations of a set of position vs. time data stored in a subsidiary memory portion of a computer in the fourth embodiment of the present invention.

Displacements of the radiation beam while moving laterally in a predetermined mode are measured in reference to time, as mentioned, and the result is plotted beforehand to form a conceptual the graph as shown in FIG. 10a. When the data of the graph in FIG. 10 is stored, a process similar to the former embodiments is performed so that the transverse coordinates of the inflection points (or the specified inflection points and/or intersections, substituted for the ideal inflection points) are determined from the stored graph data of FIG. 10. The determined transverse coordinates represent the time instants at which the inflections (or their substitutes) appear during the lateral motion of the radiation beam motion. The coordinates are translated into values which indicate positions, by the use of the data of graph of FIG. 10a, the tube wall thickness being the distance between the positions.

Figure 11:
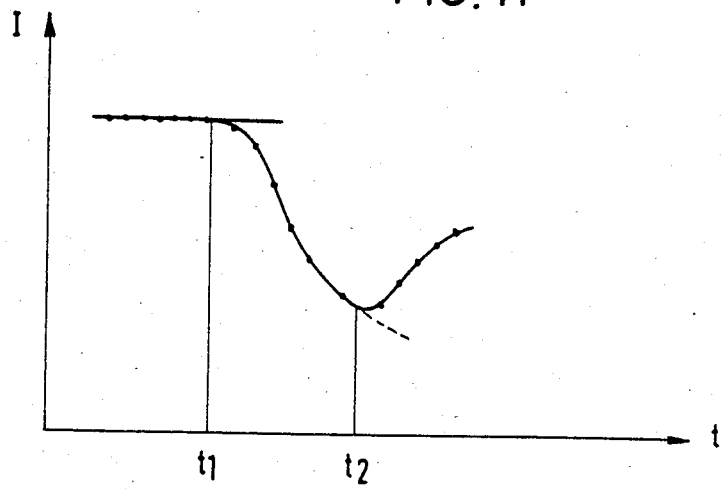
Figure 11A:
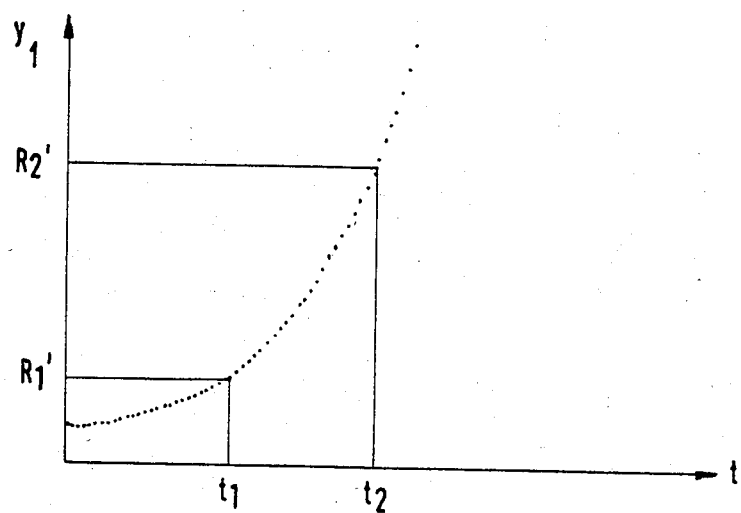

The fourth embodiment may be described more specifically with reference to FIGS. 11 and 11a. FIG. 11 being similar to FIG. 4 in appearance, but the abscissa of which represents time. FIG. 11a is a graph of data translating time into position, and is a recapitulation of FIG. 10a. The process as described in connection with FIG. 4 is used to determine the coordinates of time instants $t_1$ and $t_2$ at which the right edge of the radiation beam 2 (FIG. 3) just begins to contact the outer and inner peripheral surfaces, respectively, of the tube 1 (FIG. 3). The values of $t_1$ and $t_2$ are translated into the values of corresponding positions $R_1'$ and $R_2'$ of the moving radiation beam, using the data of FIG. 11a. The tube wall thickness is the difference between $R_1'$ and $R_2'$.

Figure 12:
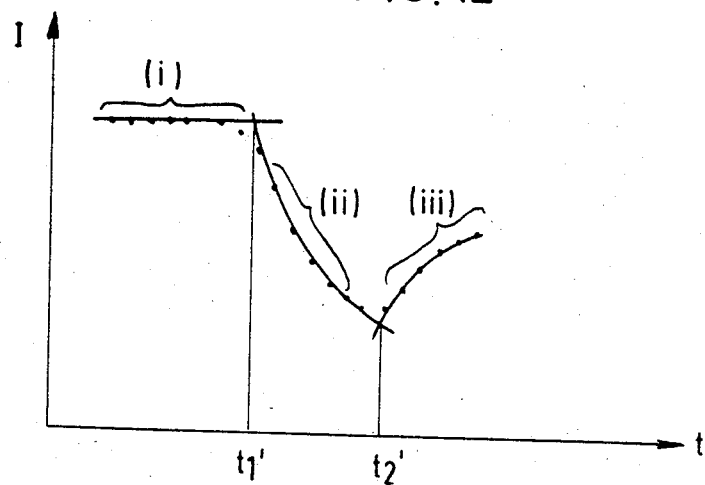
Figure 12A:
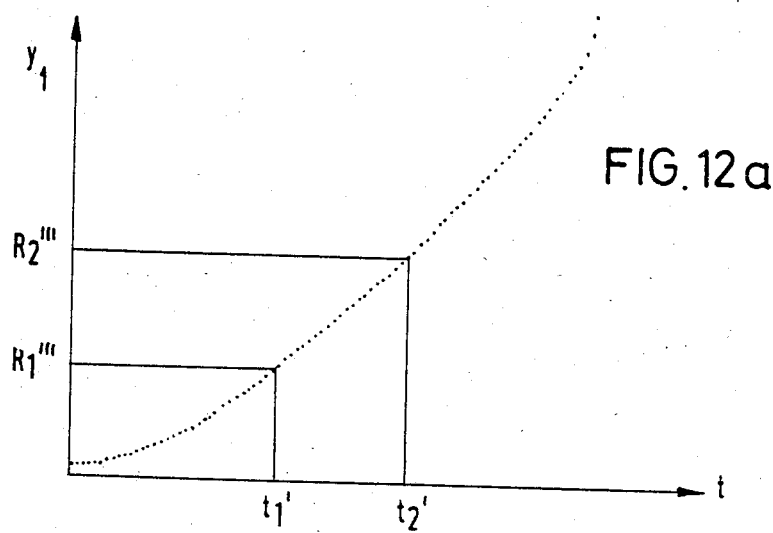

FIGS. 12 and 12a relate to a fifth embodiment of the invention, which is an alternative of the fourth embodiment of the invention. The movement of the radiation beam represented in FIG. 12 is similar to FIG. 9a. The abscissa represents time, and its data for translation of time into position is illustrated in FIG. 12a. The process, similar to the process described in connection with FIGS. 8 or 9a, is performed so that the time instants $t_1'$ and $t_2'$ (the transverse coordinates of the intersections of portions (i) and (ii), and of portions (ii) and (iii), respectively) of the graph line on the time-scale are determined. The values of $t_1'$ and $t_2'$ are then translated into the values of corresponding positions $R_1''$ and $R_2''$ of the radiation beam, using the data of FIG. 12a. Accordingly, $R_1'' - R_2''$ is the tube wall thickness.

Figure 13:
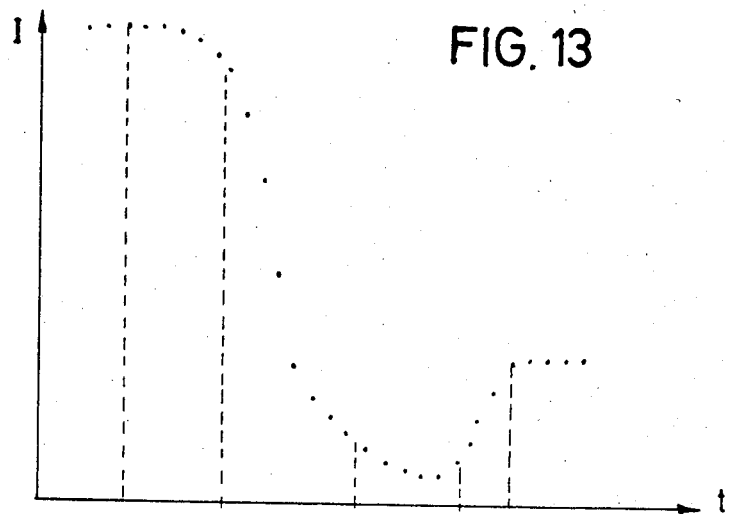
Figure 13A:
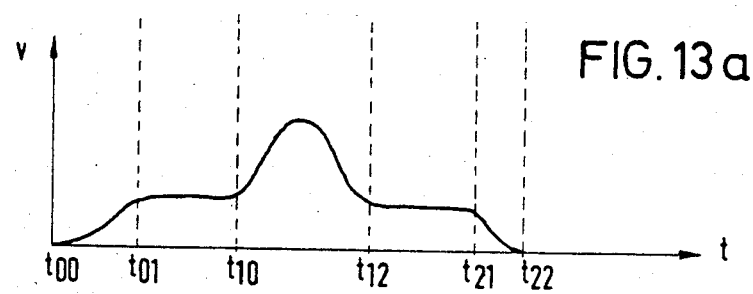
FIG. 13a is a diagrammatic illustration of a speed changing mode in the embodiment illustrated in FIGS. 13 and 13b.
Figure 13B:
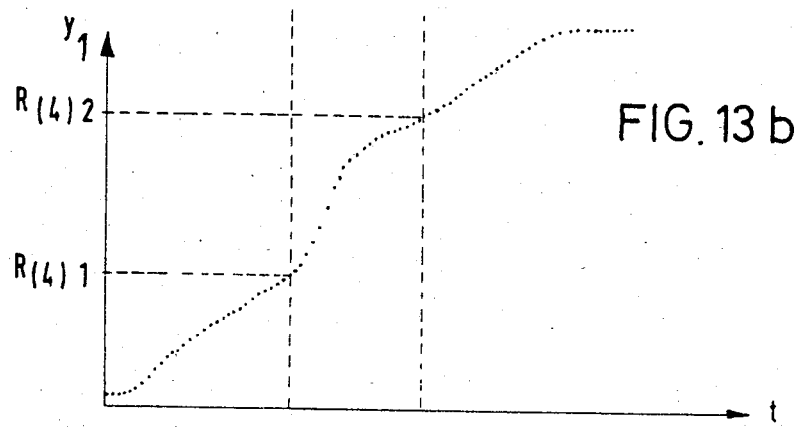

FIGS. 13, 13a and 13b relate to a sixth embodiment of the invention, which is still another alternative of the fourth embodiment of the present invention. There is provided in the sixth embodiment an improved mode for changing the speed of the lateral movement of the radiation beam. The speed of the lateral movement is set relatively low within each of the time spans for which the variation of the increment of detected radiation energy is more than a predetermined value in reference to displacement, the speed being accelerated between those time spans.

FIG. 13a shows an example of the speed-changing mode, the abscissa representing the lapse of time, and the ordinate representing the speed of radiation beam displacement relative to the tube body position. In this example, the movement of the radiation beam commences at time $t_{00}$ and is accelerated to reach a relatively low level of speed at time $t_{01}$, maintaining the speed at about that level for the span of time between $t_{01}$ and $t_{10}$. The movement is accelerated between times $t_{10}$ and $t_{12}$, and thereafter decelerated to a relatively low speed level at time $t_{12}$, again maintaining the speed at about that level for another span of time between $t_{12}$ and $t_{21}$. The equipment is then further decelerated to a standstill at time $t_{22}$. FIG. 13 shows the relation between time (abscissa) and the quantized indication of detected radiation (ordinate) when the radiation beam motion is as illustrated in FIG. 13a.

FIG. 13b shows the relation between time (abscissa) and the position of displacement of the radiation beam (ordinate). When the data of graph of FIG. 13 are stored, the process similar to the process described in connection with the fourth embodiment is performed so that a set of the time instants $t_1$ and $t_2$, as in the fourth embodiment, or another set of the time instants $t_1'$ and $t_2'$ as in the fifth embodiment, or still another set of the like in any alternative embodiment, is obtained.

It is expected that $t_1$, $t_1'$ or the like appears between $t_{01}$ and $t_{10}$ and that $t_2$, $t_2'$ or the like appears between $t_{12}$ and $t_{21}$. Then, using the data of the graph of FIG. 13b, the values of $t_1$ and $t_2$ or $t_1'$ and $t_2'$, or the like, are translated into the corresponding displacement positions $R_1'$ and $R_2'$ or $R_1''$ and $R_2''$ or the like, thus determining the tube wall thickness.

The curve illustrated in FIG. 13a is only one example of various possible modes for changing the speed of the radiation beam motion and modifications of FIG. 13a are contemplated. For example, the speed of the radiation beam may be accelerated in other time spans, around $t_{01}$ or around $t_{21}$, for example.

The time spans ($t_{01}$ to $t_{10}$ and $t_{12}$ to $t_{21}$) during which the radiation beam should run at the relatively low level of speed may be defined in accordance with a programmed control sequence stored in a portion of the computer memory when only minor deviations from the average dimensions of diameter and wall thickness are expected in the tubes being measured. In other cases, they may be defined as the time spans for which a variation in increment of detected radiation (or the value of its derivative of the second order) is more than a certain predetermined value, and the portions wherein the speed is accelerated are defined as portions other than those time spans.

The measuring equipment and electronic circuit illustrated in FIGS. 5 and 6 may also be used in the fourth, fifth and sixth embodiments of the present invention. The subsidiary memory portion for storing the data of radiation beam position vs. time may be provided in the CPU 19, or in the auxiliary processor unit 21. In embodiments using a control program for changing the motor speed, the program may be stored in the auxiliary processor unit 21. Further, if the motor speed should be changed in reference to a variation in the increment of detected radiation, the CPU 19 may include means to determine the value of the second-order derivative of the detected radiation energy, to compare it with a reference value, and to produce signals to initiate the change of the motor 12 speed in reference to the comparison result.

Figure 14:
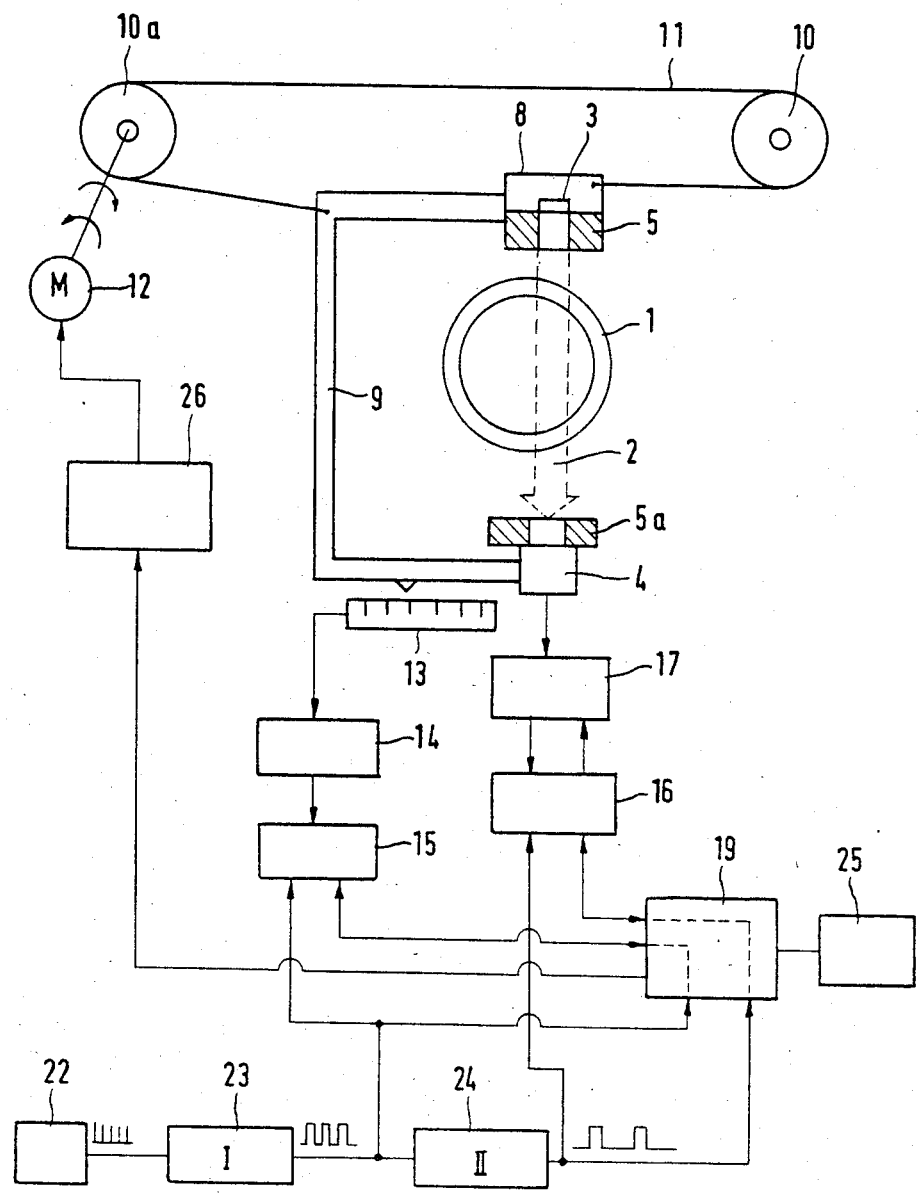
FIG. 14 is a modification of the measuring equipment and electronic circuit illustrated in FIG. 6 applicable alternatively to the fourth and fifth embodiments of the present invention.

The associated electronic circuit may be simplified in the fourth or fifth embodiments, as shown in FIG. 14, because the speed of the motor 12 need not be constant during the effective measurement operation, while it should be maintained at a constant during the effective measurement operation in the first through third embodiments.

As illustrated in FIG. 14, reference numerals 1-9, 12-17, and 22-24 denote the same elements as in FIG. 6. Numerals 10 and 10a denote pulleys with a wire 11 thereon fixed to a frame 9. The pulley 10a is coupled to a motor 12, the operation of which operates the pulleys 10 and 10a and wire 11 to laterally shift the position of the equipment with the radiation beam 2 mounted on the frame 9.

Alternatively, members 10, 10a and 11 may be a rack 10 and a pinion 11 as shown in FIG. 6. A scan-initiation signal is produced by the CPU 19 and is received by a control switch 26, to start the motor 12 to thereby start the lateral movement of the radiation beam 2. Similarly, as in the first embodiment, the CPU 19 reads the count stored in the latch circuit 16 and the position indication output stored in the latch circuit 15 whenever a reset pulse signal is produced from the first frequency divider 23. The read-out data are stored in a memory of the CPU 19. The procedures are repeated until the CPU 19 determines an end of the scanning operation. The CPU 19 then produces a scan-ending signal which is received by the control switch 26, to thereby stop the motor 12 and thereafter start its return operation.

The merit of the fourth, fifth and sixth embodiments when compared with the first, second and third embodiments is a more rapid performance of tube wall thickness measurement. While in the first through third embodiments an effective measurement does not take place during the time required by the equipment from the start of the motor until it attains its constant speed, and during its deceleration to a standstill after the net distance of the scanning operation, the fourth through sixth embodiments allow the effective measurement during those time periods. Furthermore, in the sixth embodiment, the measurement period may be shortened by the acceleration of the scanning motion in another time span or spans (for example, between $t_{10}$ and $t_{12}$ as in FIG. 13a).

A seventh embodiment of the invention uses radiation beam scanning together with other detecting means. In this embodiment, the position of the inner peripheral surface of the tube 1 being examined is detected by the use of radiation beam scanning, and the position of the outer peripheral surface of the tube 1 is detected by other edge position detection means, for example, a photoelectric device. This embodiment is particularly suitable for rapid measurement, and for gauging an object which is rotating and/or moving longitudinally at a high speed.

Figure 15:
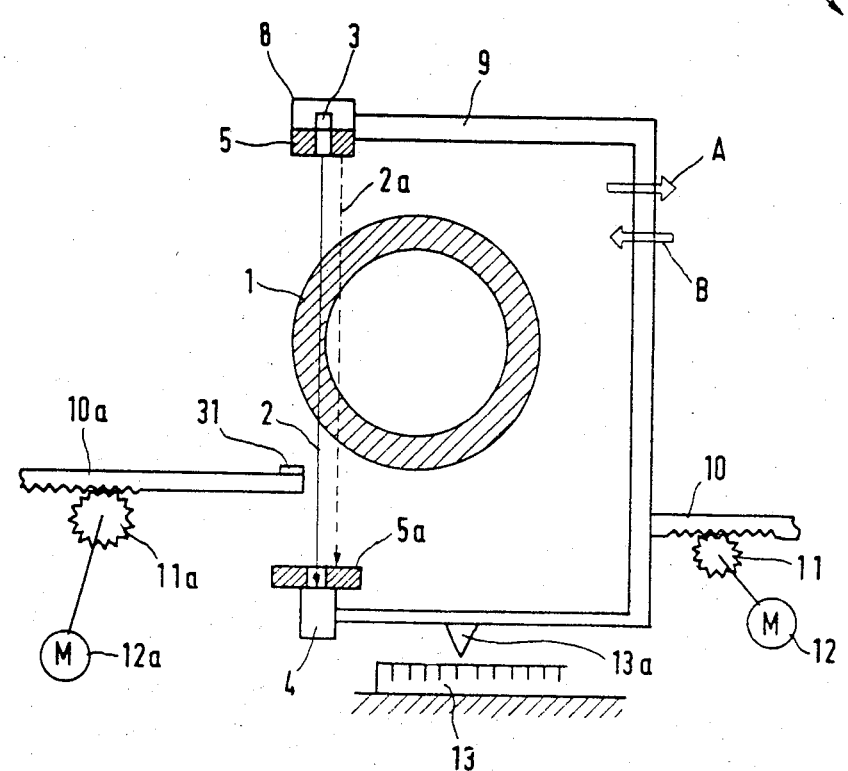
FIG. 15 is a schematic illustration of the measuring equipment of the seventh embodiment of the present invention.

FIG. 15 is a schematic illustration of the seventh embodiment. A radiation source container 8 with a radiation source 3, and a radiation beam detector 4 are mounted to a frame 9. A first motor 12 drives a rack 10 and pinion 11 mechanism, to move the frame 9 in the direction of arrow A or arrow B for scanning, so that a radiation beam 2, leading from the source 3 through collimators 5 and 5a to the radiation detector 4, shifts its position laterally. The broken line 2a indicates a position of the beam 2 after scanning. Alternatively, it may be understood that the solid line 2 illustrates the beam 2 position after scanning while the broken line 2a illustrates its position before scanning.

The embodiment uses a photoelectrical position detector 31 mounted on an end portion of another rack 10a which determines the position of the outer peripheral surface of the tube 1, as described below with reference to FIG. 17. The photoelectrical detector 31 is a known article per se and is available on the market. An advantageous feature of a photoelectrical position detector 31 is its very rapid response time of only several milliseconds. The rack 10a with the photoelectrical detector 31 is driven by the pinion 11a and the second motor 12a.

Before measuring a tube, the positions of the radiation scanning equipment and the photoelectrical detector are preset according to data of approximate outer diameter, approximate wall thickness and expected range of deviation of the wall thickness of the tube, which data may be obtained beforehand. This embodiment may also be applied in situations where data of those rough dimensions may be easily obtained or available, for example, by measurement of many mass-produced tubes.

The CPU 19 of the electronic computer (not illustrated in FIG. 15) is supplied with the data as input, and defines in accordance with that data the positions where the radiation scanning equipment and the photoelectrical detector 31 should be placed initially. The CPU 19 then produces signals for the first and second motors 12 and 12a, respectively, to drive the rack 10 and 10a and pinion 11 and 11a mechanisms so that the radiation beam 2 and the photoelectrical detector 31 are moved to those respective predefined positions.

This presetting operation is conducted in the absence of the tube body within the measuring space of the equipment. For example, an actual seamless steel pipe manufacturing process includes the step of changing the roll member when changing the rolling schedule, i.e., when tube dimensions are to be changed. Preferably, the presetting operation is conducted during that step.

Once the positions have been preset, the position of the photoelectrical detector 31 usually is not shifted before another change of the rolling schedule because a large lateral fluctuation of the position of the surface or center line of a tube moving longitudinally does not occur in an actual manufacturing or inspecting process.

Figure 16:
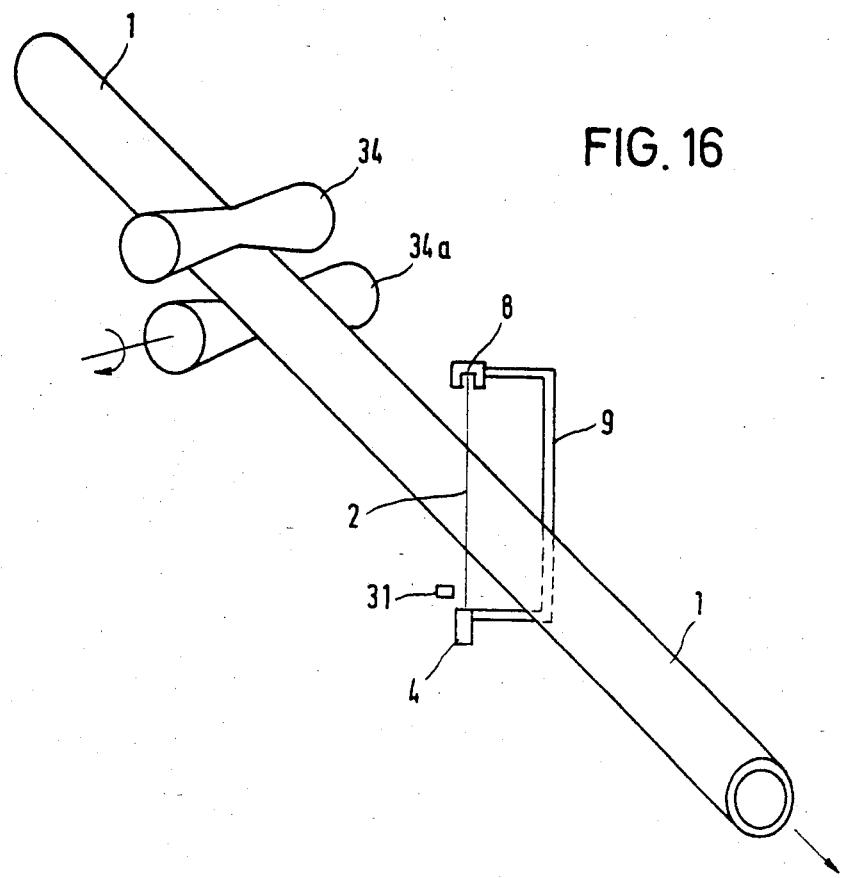
FIG. 16 is a perspective view of a typical tubular object with feed and pinch rolls.

A plurality of feed rolls 34a and associated pinch rolls 34 (only one set of which are illustrated in FIG. 16) which are drum-shaped and constricted in the middle serve to curb the lateral deviation of the running tube body 1, such that the outer peripheral surface which is to be measured by the photoelectric detector 31 is within the span where the photoelectrical detector can sense it.

The scanning operation to determine the position of the inner peripheral surface of the tube 1 by moving the radiation beam in the direction of arrow A or arrow B in FIG. 15 is similar to the operation as described in connection with the former embodiments.

The position of the outer peripheral surface of the tube 1 detected by the photoelectrical detector 31 can be represented by a distance from a point of origin coordinate in the photoelectrical detection system. The position of the inner peripheral surface of the tube 1, detected by the radiation beam scanning operation, may be represented by still another distance from a point of origin coordinate in the radiational measurement system using the moving beam. Both the points of origin are made to coincide with each other as described below in connection with FIGS. 18a, 18b and 18c. The distance between the detected positions of the outer and inner peripheral surfaces of the tube 1 may be easily determined thereafter to thereby determine the tube wall thickness.

FIG. 17 is a schematic illustration of the photoelectrical position detection device comprising a lens 36 which focuses a measured object 35 into an image 37, a linear array of semiconductive transducers 43, a signal generating circuit 38 which converts optical signals into electrical signals and supplies a set of electrical signals to an arithmetic logic circuit 41 and an amplifier 40 representative of the image 37, a drive circuit 39 for the signal generating circuit 38, and a result indicating means 44.

As described herein the measurement detects a one-dimensional quantity. The linear array of transducers 43 comprises hundreds or thousands of photodiodes aligned at intervals between 0.015 mm and 0.05 mm, and which store in associated elements in the signal generating circuit 38 electric charges proportional to the light intensities illuminating them. The stored charges are utilized in turn by a connection, shifting with a clock pulse delivered by the drive circuit 39, to form a series of electrical signals. A large signal magnitude represents a bright portion of the image and a small signal magnitude represents a dark portion of the image. The signals are supplied to the arithmetic logic circuit 41 via the amplifier 40. The arithmetic logic circuit 41 determines the position of the border point or edge between the bright and dark portions in the image 37 and represents the position of the edge of the measured object in the coordinate of the photoelectric detection system, which is then indicated by the indicating means 44. (If the measured object is a luminous body, for example, an iron member at a temperature of 800° C. or more, illumination is not required. Otherwise, additional illumination may be required.)

Figure 18C:
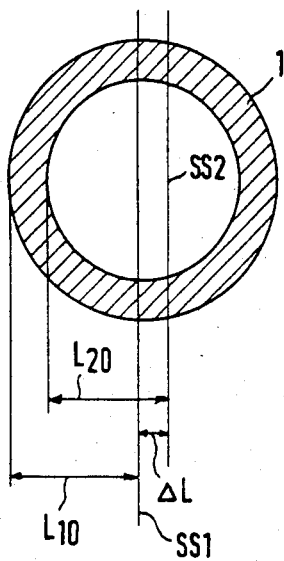

FIGS. 18a–18c illustrate the technique used to align the points of origin in the photoelectrical detection system (the position of the outer peripheral surface) and in the radiational measurement (the position of the inner peripheral surface) with each other. I and y denote like values as in FIGS. 3 and 4.

In FIGS. 18a and 18b, a sample object 35 having a reference edge E is placed within the measuring span of the photoelectric detector 31. The position of the edge E is measured by the photoelectric detector 31 which indicates a value $L_1$ (in FIG. 18a) as the distance between the origin position SS1 of the photoelectric detection system and the edge E. Next, the position of the same edge E is measured by moving the radiation beam 2 to a position 2a (in FIG. 18b), which indicates a value $L_2$ as the distance between the provisional origin position SS2 of radiation beam system and the edge E. The difference $\Delta L = L_2 - L_1$ is thereby obtained. If using a new origin of this coordinate system shifted by $\Delta L$ from the position SS2 toward the position of the edge E, it coincides with the position SS1 of the origin of the photoelectrical detection system.

As illustrated in FIG. 18c, the position of the outer peripheral surface of a tube 1 is measured by the photoelectrical detector 31, which indicates a distance $L_{10}$ between it and the origin position SS1. The position of the inner peripheral surface of the tube 1 is measured by scanning with the radiational beam, which indicates a distance $L_{20}$ between it and the provisional origin position SS2. The tube wall thickness H may be determined then as:

$$H = L_{10} - (L_{20} - \Delta L)$$

With reference again to FIG. 15, the equipment illustrated is associated with an electronic circuit which may be similar to the circuit illustrated in FIG. 6 used in the first through third embodiments, or similar to the circuit illustrated in FIG. 14 used in the fourth and fifth embodiments. The speed of the lateral movement of the radiation beam may be maintained at a constant during the effective measurement as in the first through third embodiments, or may vary during the effective measurement as in the fourth through sixth embodiments. Its performance will be described herein where the speed is variable.

Figure 19C:
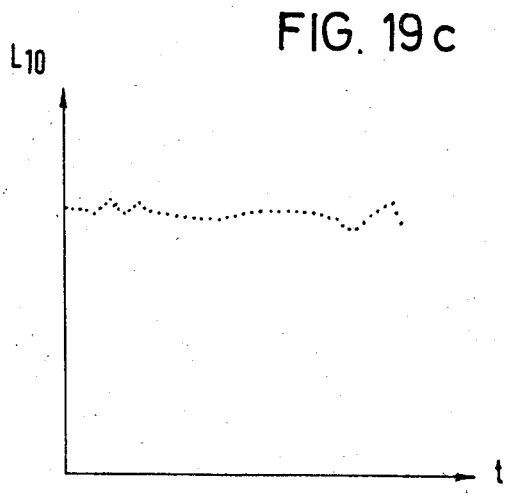
FIG. 19c is a diagrammatic illustration of a set of data of photoelectrically detected outer peripheral surface positions in the seventh embodiment of the present invention.
Figure 19A:
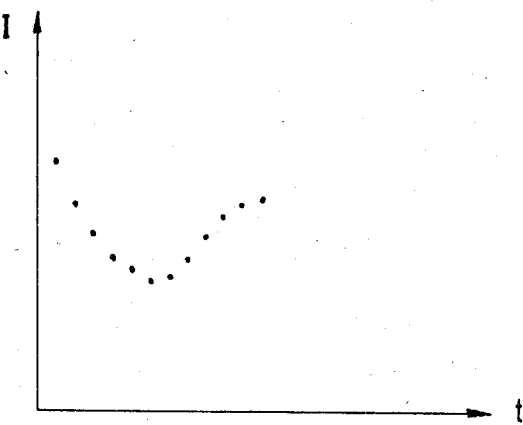
FIGS. 19a and 19b are diagrammatic illustrations for the seventh embodiment of the present invention similar to the illustrations in FIGS. 11 and 11a, wherein the radiation beam scanning equipment is used only for detecting the inner peripheral tube surface.
Figure 19:
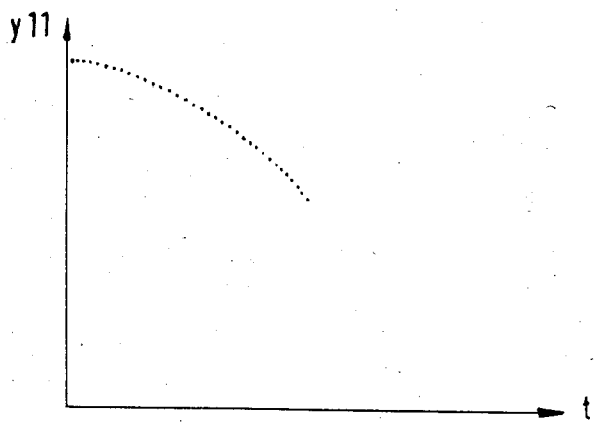

The intensity of the radiation beam 2 reaching the detector 4 is detected during scanning and electronically processed, as in the former embodiments, so that the quantized data I of the detected radiation beam intensity are obtained, as shown for example in FIG. 19a, in the form of data dispersed at a predetermined time interval. The period T may be, for example, 0.1 second. Note that the abscissa of FIG. 19a represents time. While the intensity of the radiation beam 2 is being detected, the distance $y_{11}$ from the provisional origin position SS2 to the moving radiation beam 2 is being measured, for example, by the scale 13 as in the first embodiment. The digital output indicating the beam 2 position is produced at far finer time intervals than the quantization period T.

An example of the relation between time and the measured values of the distance $y_{11}$ is shown in FIG. 19b, the abscissa, again representing time. The distance $L_{20}$ from the origin position SS2 to the position of the inside tangent of the tube body 1 is obtained in a manner similar to the manner discussed in connection with the fourth through sixth embodiments.

While the intensity of the radiation beam 2 and the beam 2 position are being measured, the distance $L_{10}$ from the origin position SS1 to the position of the outer tangent of the tube body 1 is being measured by the use of the photoelectrical detector 31. The distance $L_{10}$ fluctuates slightly over time because the tube moves longitudinally and the outer surface of the tube 1 is not always perfectly straight in the longitudinal direction. An example of measured results of the distance $L_{10}$ is illustrated in FIG. 19c, the abscissa representing time. The data representing the measured distance $L_{10}$ is stored in another portion of the computer memory.

The instant in time when the radiation beam 2 detects the inner tangential point of the tube 1 is determined (as in FIG. 19a) from the quantized data I of the detected radiation intensity. Thus, the distance $L_{10}$ at that instant may be determined easily by the electronic computer. Using this distance $L_{10}$ and the above obtained values of $L_{20}$ and $\Delta L$, the tube wall thickness H is expressed, as mentioned above, as:

$$H = L_{10} - (L_{20} - \Delta L).$$

An advantage of the seventh embodiment is that it is more suited to rapid measurement than the former embodiments, and is particularly suited for gauging the tube wall thickness of a tube which is rotating and/or moving longitudinally rapidly. Rotating or longitudinal movement of the tube 1 is used in some rolling mills and the like.

Figure 20A:
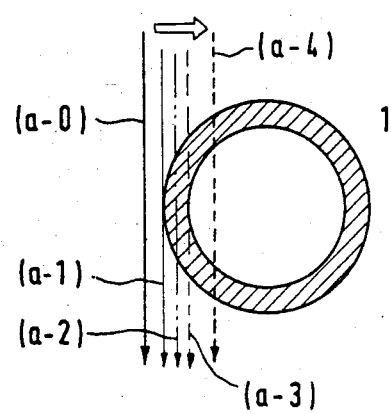
FIGS. 20a, 20b and 20c are schematic illustrations showing the relative positions of a radiation beam with respect to a rotating or longitudinally moving tube body relating to the seventh embodiment of the present invention.
Figure 20B:
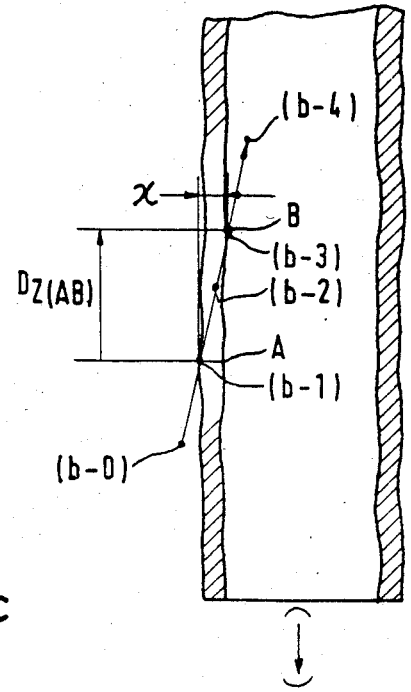
Figure 20C:
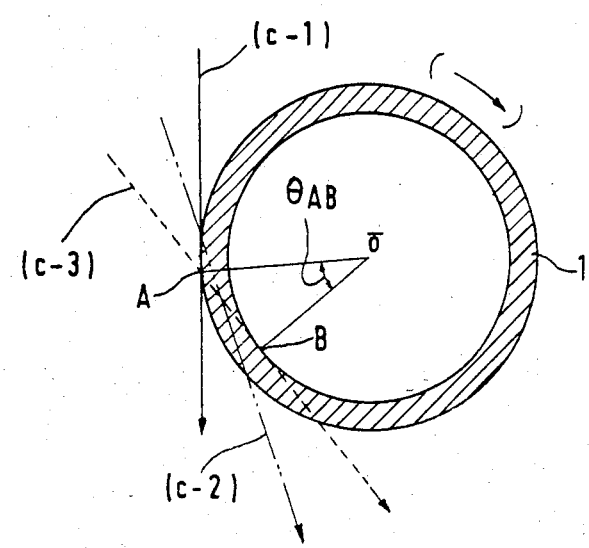

This advantageous feature is further described with particular reference to FIGS. 20a through 20c which show the relative positions of a radiation beam 2 with respect to a rotating and/or longitudinally moving tube 1, the former illustrated in cross-section in FIGS. 20a and 20c, and the latter illustrated by a longitudinal portion with exaggerated surface unevenness in FIG. 20b.

If a single radiation beam 2 is used for scanning the tube wall to determine both its outside and inside tangential points, as in the first through sixth embodiments, the radiation beam moves laterally, as illustrated in FIG. 20a, from an initial position shown by the solid line (a-o) to a terminus position shown by the broken line (a-4). Sketching the relative positions of the radiation beam with respect to the tube body 1, with reference only to its longitudinal running motion, as illustrated in FIG. 20b (where the direction of radiation beam axis is perpendicular to the axis of the tube), the initial position of the beam is at a point (b-o) and its terminus position is at another point (b-4). At point (b-1) the beam contacts the outer periphery of the tube, and at point (b-3) it contacts the inner periphery of the tube.

Thus, the tube wall thickness H is determined using the outer and inner radii measured at positions longitudinally distant from each other. If the unevenness of the longitudinal stream of the tube wall is unnegligible, and the speed of the longitudinal movement of the tube 1 is so high in relation to the speed of the lateral movement of the radiation beam 2, the measurement includes an undesirable unnegligible error.

Sketching the relative positions of the radiation beam 2 with respect to the tube body 1, with reference only to its rotating motion as illustrated in FIG. 20c, the beam 2 contacts the outer periphery of the tube 1 at the position indicated by the solid line (c-1), and contacts the inner periphery of the tube 1 at the position indicated by the broken line (c-3). The contact points A and B are distant from each other in the peripheral direction. An unevenness of the tube wall stream in the peripheral direction and a high rotating velocity of the tube may cause yet another undesirable unnegligible error in measurement.

In accordance with the seventh embodiment of the invention, however, values indicating the radial position of the outer tube surface are obtained at much finer intervals than the unitary quantization period T due to the rapid performance of the photoelectrical position detector 31, while the radiation beam 2 is scanning the radial position of the inner tube surface, moving from its position shown by the dot and dash line (a-2) in FIG. 20a, line (c-2) in FIG. 20c or a point (b-2) in FIG. 20b to its terminus position (a-4), (c-4) or (b-4), respectively. Consequently, the radial position of the outer peripheral surface of the tube 1 corresponding to the tangential contact point on the inner peripheral surface of the tube 1 detected by the radiation beam 2 may be determined. Therefore, improved measurement accuracy is obtained even when the tube is rotating rapidly or moving rapidly in the lateral direction.

FIG. 21 illustrates an eighth embodiment of the invention, which is a modification of the seventh embodiment. In the eighth embodiment a second photoelectrical position detector 31a, and second radiation beam scanning equipment 4a, 8a and 9a, similar to the detector 31 and the equipment 4, 8 and 9 mentioned above, are provided. The second apparatus 31a, 4a, 8a and 9a is used to gauge the wall thickness of the tube 1 at a position other than that gauged by the first apparatus 31, 4, 8 and 9. (If the portions of the wall to be measured are opposite each other, the second apparatus 31a, 4a, 8a and 9a may be eliminated, the single apparatus 4, 8 and 9 instead laterally scanning the full inner diameter of the tube 1.)

FIG. 22 illustrates a ninth embodiment of the invention which is still another modification of the seventh embodiment. In the ninth embodiment an X-ray photoelectrical position detector 31x is substituted in place of the radiation beam scanning equipment. This detector 31x operates on the same principle as the photoelectric detector 31 described in connection with FIG. 17, but uses X-rays instead of visible light, and the semiconductive transducers 43 of the linear array are photodiodes sensitive to X-rays.

The positions of the detectors 31 and 31x are preset, and intensities of transmitted X-rays projected on the linear array provide data similar to the data of quantized radiation beam intensity I plotted on a time coordinate axis as in the seventh embodiment. Consequently, the position of the tangential point on the inner peripheral wall of the tube 1 can be determined using the same principles as in radiation beam scanning. The outer peripheral surface is also detected by the detector 31 in a manner similar to the photoelectric detector 31 of the seventh embodiment, and accordingly, the tube wall thickness can be determined.

The X-ray detecting device has a faster response time than the radiation beam scanning equipment. Therefore, this embodiment offers a further improved method and apparatus for rapid tube wall thickness measurement when the tubes are rapidly rotating or moving rapidly in the longitudinal direction.

In the above-described embodiments the direction of movement of the radiation beam 2 across the axis of the tube during the scanning operation is perpendicular to the axis of the radiation beam. The invention may be modified, however, to operate when those axes are at an arbitrary angle with respect to each other, as illustrated in FIG. 23. The radiation beam 2 is at an angle $\alpha$ (not a right angle) to the direction of movement of the radiation beam equipment during scanning, and indicates the tube wall thickness $H_a$. Accordingly, the actual wall thickness value H can be obtained by solving the equation:

$$H = H_a \sin \alpha$$

When adapted to the seventh embodiment of the present invention as illustrated in FIG. 23a, the path of the ray to the detector 31 is parallel to the radiation beam axis, and the tube wall thickness is:

$$H = H_a \sin \alpha$$

The invention also may use beta rays, ultraviolet rays, or infrared rays instead of gamma rays or X-rays when gauging objects made of metal, plastics or glass.

Also, the thickness of the radiation beam 2 may be adjusted so that it increases as it approaches the detector, rather than maintaining a constant thickness as described in the above embodiments.

The invention also includes an improved device for aligning the collimator members. Using conventional techniques this operation is complicated requiring a relatively long period of time and costly apparatus. In conventional techniques, two collimator members each having a machined surface perpendicular to the direction of movement of the radiation beam across the tube, are placed with their respective machined surfaces parallel to each other. The members are moved parallel to each other until the point of maximum radiation intensity reaching the detector is determined. However, the difficulty in determining a sharp maximum point of detected intensity often results in inaccuracies.

Alternatively, a collimator member having a long slit through which the radiation beam passes is used as the collimator member, and is placed near the radiation source to produce a substantially narrowed radiation beam. To determine the spot illuminated by the beam, test shots are conducted using X-ray film, or other film sensitive to radiation, at a position near the radiation detector. Another collimator member with the detector is then set at that determined spot. A disadvantage of this technique, however, is the high manufacturing cost of machining a long collimator body with a long slit. Additionally, the capacity of the radiation source must be large due to the relatively long distance between the radiation source and the detector, causing an increase in the weight of the equipment, as well as further increasing costs.

To eliminate the above disadvantages, the collimator alignment device of the present invention uses an aligning ruler and a specific configuration of either the collimator body or the ruler. The ruler has precisely machined ruling surfaces at both its end portions and is placed in a position along a predetermined line parallel to and at a known distance from the radiation beam axis. Each collimator, or its part, is positioned so as to have its slit or a surface of its slit closely contact the ruling surface. The ruler is thereafter removed.

To facilitate this adjustment the body of the collimator or the ruler may comprise two or more separable parts. If the collimator comprises two parts, its first part is first positioned to contact with the ruler, the second part being coupled with the first part after the ruler is removed.

Figure 24A:
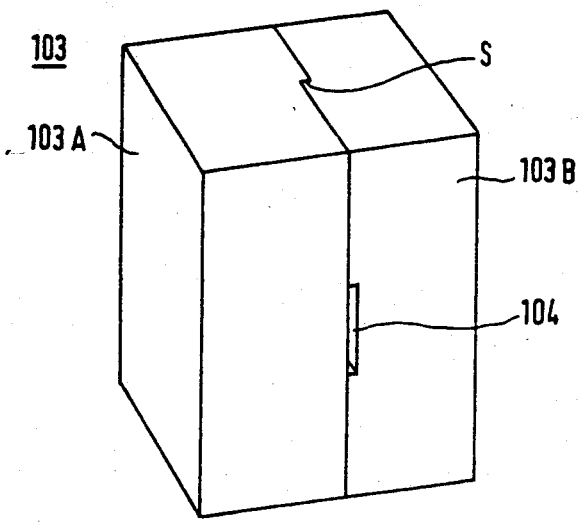
Figure 24B:
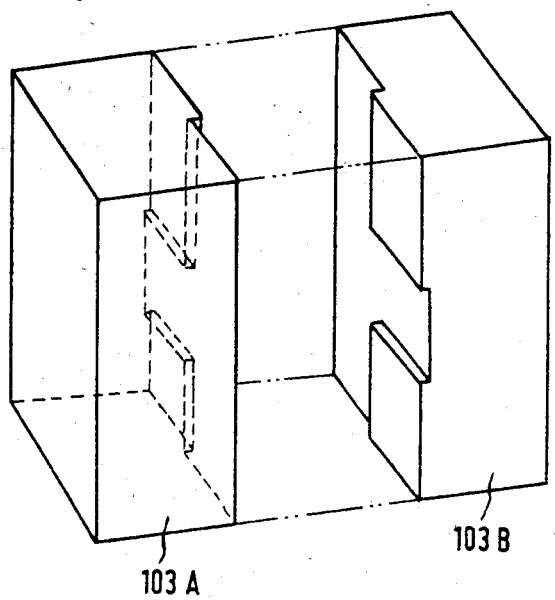
FIG. 24b is a perspective view of the collimator of FIG. 24a with the two parts thereof separated.

FIG. 24a is a perspective view showing an embodiment of a collimator member 103 comprising two blocks 103A and 103B. FIG. 24b is a perspective view of the same collimator blocks separated from each other. The two blocks 103A and 103B are identical in shape and placed opposite each other when assembled. The facing surfaces of each are formed with a T-shaped flat depression and two flat protrusions. When assembled, the protrusions of one part engage the two arm portions of the T-shaped depression of the other, the remaining trunks of the T-shaped depressions thereby forming a straight slit 104 through which the radiation beam passes. The edge S prevents radiation leakage from the blocks other than through the slit 104.

In a radiation beam generating and detecting system generally two collimators are used, both of which are formed as shown in FIGS. 24a and 24b, and mounted directly, or through supporting members, on the equipment frame of the system.

Figure 25A:
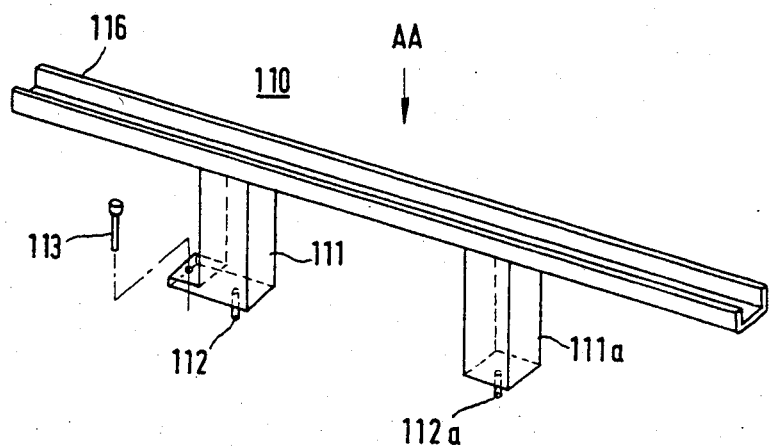
FIG. 25a is a perspective view of an aligning ruler.
Figure 25B:
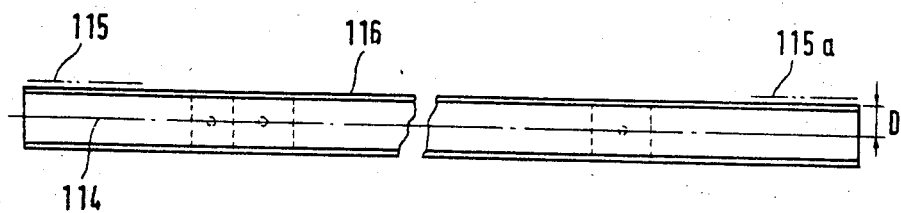

As illustrated in FIGS. 25a and 25b, the aligning ruler 110 comprises a channel bar 116 and two piers 111 and 111a mounted to the bar 116 and arranged to provide adequate rigidity. Positioning pins 112 and 112a are mounted to the bottom surfaces of the piers 111 and 111a, respectively. The bottom surfaces of the piers 111 and 111a are on a line parallel to the center line of the bar 116.

One side of the bar 116 has both its end portions precisely machined as ruling surfaces 115 and 115a which are in the same plane parallel to the referential plane 114 which contains the axes of the positioning pins 112 and 112a, both planes being perpendicular to the bottom surfaces of the piers 111 and 111a.

Figure 26:
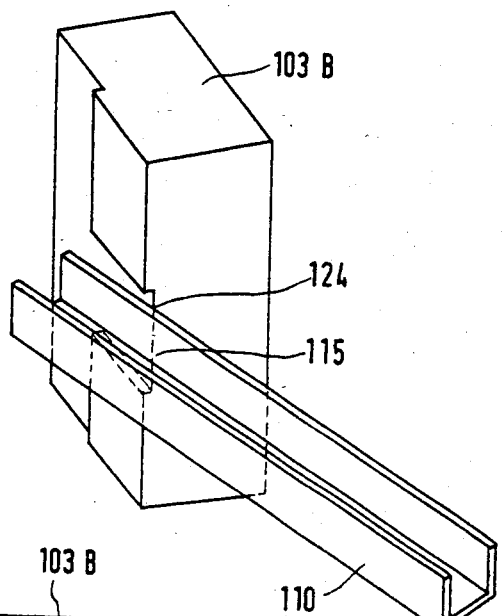

The equipment is assembled as illustrated in FIG. 26. The frame 120 has a flat surface on which the equipment is mounted having two holes 121 and 121a into which are fitted the positioning pins 112 and 112a. The holes 121 and 121a are on a line parallel to the axis of the radiation beam and which lies at a distance D from the plane perpendicular to the surface of the frame 120 which contains the axis of the radiation beam. The distance D between the line containing the holes 121 and 121a and the plane containing the beam axis preferably is identical to the distance between the referential plane 114 and the plane of the ruling surfaces 115 and 115a (see FIG. 25b).

The ruler 110 is first put on the flat surface of the frame 120 so that the positioning pins 112 and 112a are in the holes 121 and 121a. The ruler 110 is then secured to the frame 120 by the bolt 113. A first part 103B of the first collimator member is tacked to the bracket 122 as shown in FIG. 26, and the bracket 122 is then tacked to the frame 120. Alternatively, the collimator half 103B may be tacked to the bracket 122 after the bracket 122 is mounted on the frame 120.

The radiation source container, not shown in FIG. 26, will be mounted later on the opposite side of the bracket 122 to the other part of the first collimator member. The bracket 122 is formed with an opening adequate for the radiation beam to pass therethrough. The position of the collimator half 103B is then adjusted so that the surface of the depression trunk which forms the slit of the collimator half 103B just contacts the ruling surface 115 of the ruler 110.

This adjustment may be made, referring to FIG. 26a, as follows. Before securing the bracket 122 to the frame 120, the bracket 122 with the collimator half 103B is placed thereon at such a position that the vertical edge 124 of the depressed surface of the collimator half 103B contacts the ruling surface 115. The position in which the collimator half is to be mounted to the bracket 122 is then finely adjusted so that no clearance exists between the edge 124 and the ruling surface 115. Once in this position, the collimator half 103B is secured to the bracket 122 by a bolt through a hole 125, for example. The position of the bracket 122 and collimator half 103B is adjusted until the depressed surface of the collimator half 103B and the ruling surface 115 are in close contact. The bracket 122 is then secured to the frame 120 by bolts not shown.

The first half 103'B of the second collimator is then adjusted. This collimator half 103'B is tacked on another supporting member, such as a pedestal 126, on the detector side of the apparatus by a stud bolt 129 or the like. Its position is adjusted in a manner similar to the above, the collimator half 103'B being placed so that a vertical edge of its depressed surface contacts the ruling surface 115a. The position of the pedestal 126 and the block 103'B is then finely adjusted by changing the number or positions of very thin mats 127 and 128 below the pedestal 126 until no clearance exists between the edge and the ruling surface 115a as above. Then, the pedestal 126 is secured to the frame 120, the collimator half 103'B being adjusted so the depressed surface is in close contact with the ruling surface 115a. Once adjusted the collimator half 103'B is secured to the pedestal 126 by the stud bolt 129. The ruler 110 is then removed, and the second collimator halves 103A and 103'A (not shown in FIG. 26) of the first and second collimators are coupled with the first halves 103B and 103'B, respectively.

Figure 27:
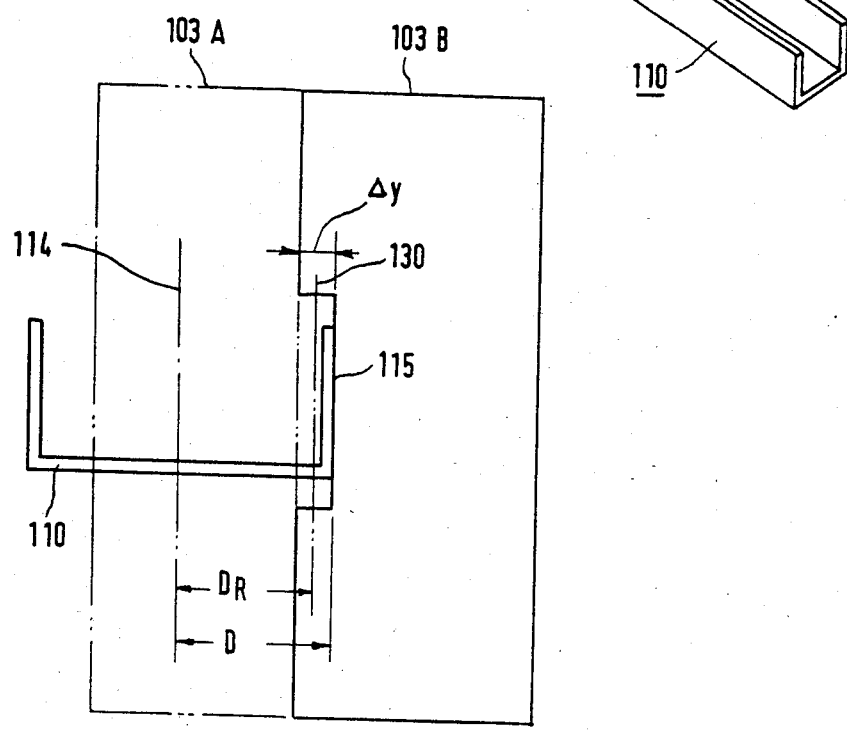

The position of the radiation beam with respect to the frame 120 or to the ruler 110 in FIG. 26 can be accurately determined as follows. Referring to FIG. 27, the space defined between the right side of the second half 103A of the collimator and the depression of the first half 103B represents the radiation beam. The center plane 130 of the slit lies parallel to the referential plane 114 and at a distance $D_R$ therefrom. The distance $D_R$ then is:

$$D_R = D - \Delta y/2$$

where D is the distance between the referential plane 114 and the ruling surface 115 or 115a, and $\Delta y$ is the depth of the depression of the block 103B (which is the same as the thickness of the radiation beam).

The distance D is accurately determined due to the precise machining of the ruling surfaces 115 and 115a as already mentioned. The depressed surface is also precisely machined so as to provide an accurate depth $\Delta y$. Therefore, an accurate value of the distance $D_R$ to indicate the position of the radiation beam is obtained.

An alternative of the device for aligning the collimators using an aligning ruler having, instead of a unitary bar member as described above, a bar comprising separable parts, is also provided. Each collimator in this embodiment is unitary rather than comprising separable parts as described above.

Figure 28:
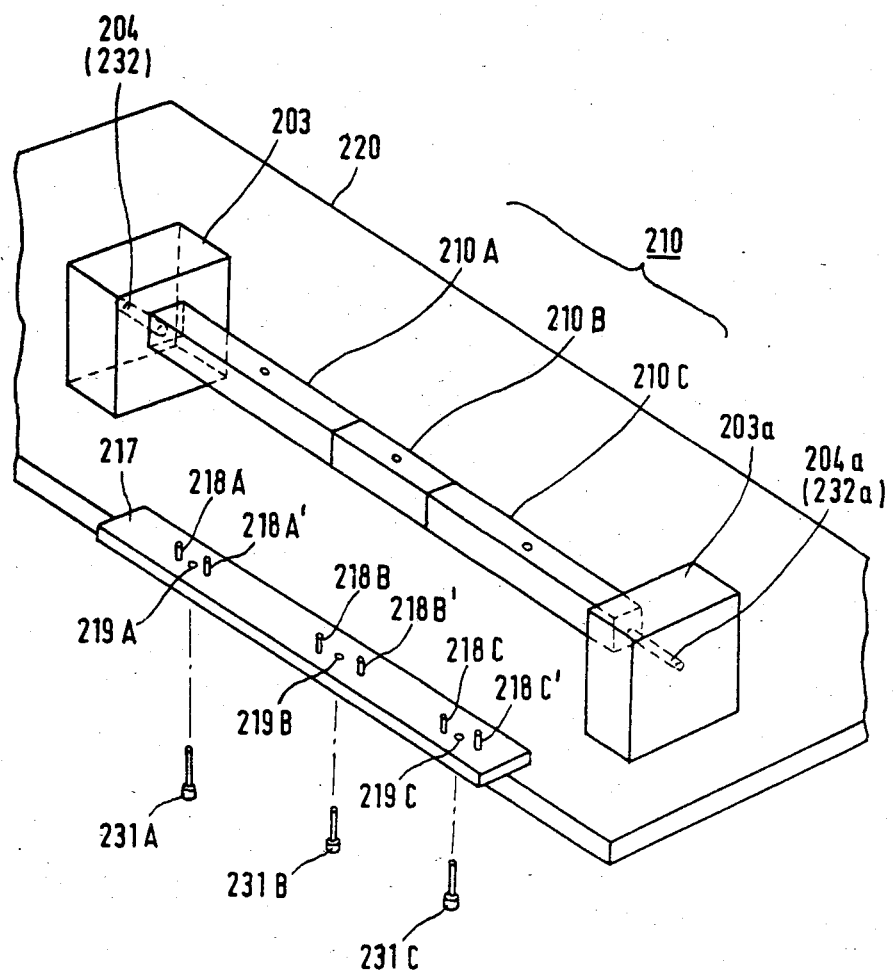

FIG. 28 is a perspective partly exploded view of this alternative embodiment. The collimators 203 and 203a have respective slits 204 and 204a which form the radiation beam passage. The aligning ruler 210 comprises three separable bar parts 210A, 210B and 210C.

A fixture bar 217 is provided with subpositioning pins 218A, 218A', 218B, 218B', 218C and 218C', which engage corresponding holes (not illustrated) in the bar parts 210A, 210B and 210C. The fixture bar 217 is also provided with holes 219A, 219B and 219C, through which stud bolts 231A, 231B and 231C, respectively, are inserted to engage with screw holes in the respective bar parts 210A, 210B and 210C. The three bar parts 210A, 210B and 210C and the fixture bar 217 thus form a unitary ruler assembly 210. The bar parts 210A and 210C have projections 232 and 232a, respectively, which are precisely machined to fit the slits 204 and 204a of the collimators 203 and 203a, respectively.

The bar parts 210A, 210B and 210C and the fixture bar 217 are assembled into the ruler 210 for mounting and aligning the collimators on the frame 220. The collimator 203 is put into position on the frame. The ruler assembly (210 and 217) is then mounted to the collimator 203 by inserting its projection 232 into the slit 204 in a position so the fixture bar 217 is not facing the frame 220. If necessary, the ruler 210 and 217 may first be placed in position on the frame 220 using a supporting member (not shown), the collimator 203 thereafter being mounted to the ruler. The other collimator 203a is then mounted to the ruler by inserting the other projection 232a into the slit 204a, thus aligning the two collimators.

To dismantle the assembly, the stud bolts 231A, 231B and 231C are removed, the fixture bar 217 is separated from the bar parts 210A, 210B and 210C, and the center part 210B is disassembled from the other parts 210A and 210C.

Figure 29:
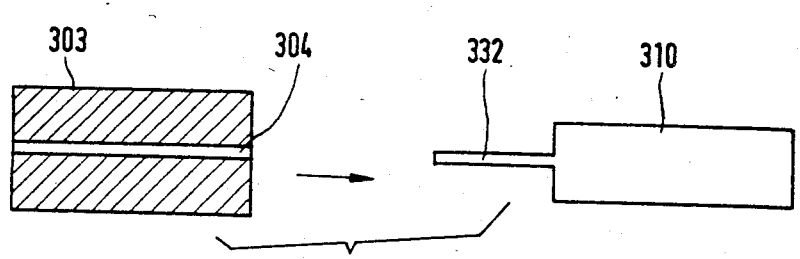
Figure 29:
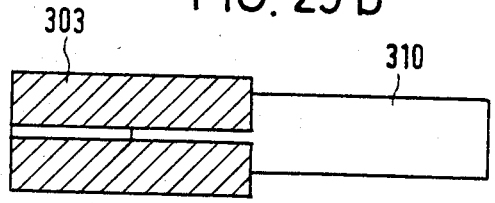

The device illustrated in FIG. 28 can be simplified so that only a single relatively long collimator member having a long slit in the direction of the radiation beam is provided. As illustrated in FIGS. 29a and 29b, the bar member 310 of the aligning ruler is a unitary structure having a single projection 332. The bar member is put into position on the frame of the equipment and the collimator 303 aligned so that the projection 332 is inserted into the slit 304 (see FIG. 29b). After the collimator 303 is secured to the frame, the bar member is removed. To ensure rigidity the projection 332 preferably is not long.

Figure 30:
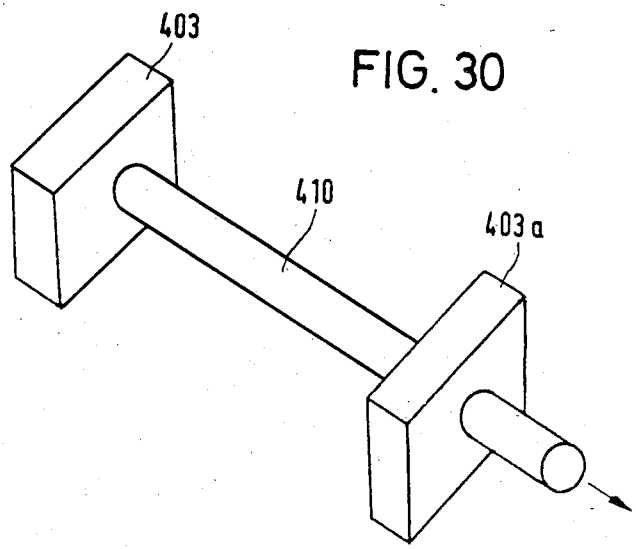

FIG. 30 is a perspective view of still another embodiment of the alignment device of FIG. 28. The bar member 410 is drawn through the slit of the collimator 403a which has dimensions identical with the bar 410, thus ensuring the rigidity of the bar 410.

While there has been described what are believed to be the preferred embodiments of the invention, those skilled in the art will recognize that other and further modifications may be made thereto without departing from the spirit of the invention, and it is intended to claim all such modifications as fall within the true scope of the invention.

We claim:

1. A method of aligning two collimator members used in radiation beam scanning equipment for tube wall thickness measurement, each of the collimator members comprising two separable parts with facing surfaces, each part having a generally T-shaped depression and two flat protrusions formed on its respective surface, to define a slit between the two parts through which the radiation beam passes when the two parts are assembled together with the protrusion of one part contacting the depression of the other part, wherein the equipment comprises an aligning ruler including a straight bar member both ends of which are precisely machined and forming ruling surfaces which fit the surface of the collimator members defining the slit, the method further comprising the steps of separating the collimators into their respective two parts, placing the ruler in a position contacting the respective first parts of the collimators along a predetermined line parallel to the axis of the radiation beam, placing each collimator first part such that the surface defining the slit are just in contact with the respective ruling surfaces of the ruler so that the collimators are thereby properly aligned, thereafter removing the ruler, and coupling the respective second parts of the collimators back with their respective first parts.

2. The method as set forth in claim 1, wherein the ruler including the straight bar member comprises three separable parts assembled into a unitary member held by fixture means while the straight bar member is being used to align the collimators, and which separable parts are disassembled when the parts are to be removed after the collimators have been properly aligned.

* * * * *